United States Patent
Yabushita et al.

(10) Patent No.: US 8,280,574 B2
(45) Date of Patent: Oct. 2, 2012

(54) PATH PLANNING DEVICE AND METHOD, COST EVALUATION DEVICE, AND MOVING BODY

(75) Inventors: Hidenori Yabushita, Toyota (JP); Kazuhiro Mima, Toyota (JP); Yoshiaki Asahara, Obu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 698 days.

(21) Appl. No.: 12/442,234

(22) PCT Filed: Jul. 4, 2008

(86) PCT No.: PCT/JP2008/062543
§ 371 (c)(1),
(2), (4) Date: Mar. 20, 2009

(87) PCT Pub. No.: WO2009/011295
PCT Pub. Date: Jan. 22, 2009

(65) Prior Publication Data
US 2010/0082194 A1    Apr. 1, 2010

(30) Foreign Application Priority Data

Jul. 18, 2007    (JP) .................................. 2007-187100

(51) Int. Cl.
*G01C 22/00* (2006.01)
(52) U.S. Cl. ........................... 701/25; 701/409; 700/253
(58) Field of Classification Search .................... 701/25, 701/208, 409; 700/253
See application file for complete search history.

(56) References Cited

U.S. PATENT DOCUMENTS 5,625,559 A * 4/1997 Egawa .......................... 701/117
(Continued)

FOREIGN PATENT DOCUMENTS

JP    06-289929 A    10/1994
(Continued)

OTHER PUBLICATIONS

Supplementary European Search Report dated Mar. 28, 2011.

*Primary Examiner* — Behrang Badii
*Assistant Examiner* — Shardul Patel
(74) *Attorney, Agent, or Firm* — Kenyon & Kenyon LLP

(57) ABSTRACT

To generate an optimal path in a search space represented by a grid. A path search device includes: an edge generation section that generates edges extending to neighboring nodes located at least forward and diagonally forward right and left of a focus node, assuming that each grid point is a node and that a minimum cost node among end nodes each located at an end of the edges is the focus node, when a cost from a start point to a given node is a cost of the given node; an edge cost calculation/readout section that reads out a shortest distance from a reference node to the neighboring node (first distance) and a shortest distance from the reference node to the focus node (second distance) from a database, assuming that a node obtained by tracing back a predetermined number of nodes from the focus node in a direction toward the start point along the path is the reference node; a path cost calculation section that calculates a cost of a path from the start point to the neighboring node as a sum of costs of edges constituting the path; and a path determination section that selects a path having a minimum cost from the start point to the end point.

4 Claims, 24 Drawing Sheets

U.S. PATENT DOCUMENTS

| | | | |
|---|---|---|---|
| 6,067,572 A * | 5/2000 | Jensen et al. | 709/241 |
| 6,098,107 A * | 8/2000 | Narvaez-Guarnieri et al. | 709/239 |
| 7,079,943 B2 * | 7/2006 | Flann et al. | 701/423 |
| 7,844,393 B2 * | 11/2010 | Takizawa | 701/416 |
| 7,869,946 B2 * | 1/2011 | Couckuyt et al. | 701/420 |
| 2004/0117079 A1 | 6/2004 | Hulden | |
| 2004/0193365 A1 | 9/2004 | Kokojima et al. | |
| 2006/0149465 A1 | 7/2006 | Park et al. | |
| 2006/0167601 A1 | 7/2006 | Henning et al. | |
| 2007/0276541 A1 * | 11/2007 | Sawasaki | 700/253 |
| 2009/0043489 A1 * | 2/2009 | Weidner | 701/201 |

FOREIGN PATENT DOCUMENTS

| | | |
|---|---|---|
| JP | 2001-324343 A | 11/2001 |
| JP | 2005-032196 A | 2/2005 |

* cited by examiner

EXTEND FROM [n7]

EXTEND FROM [n8, n13]
EXTEND FROM [n2, n14]

EXTEND FROM [n9, n19]

EXTEND FROM [n20, n15]

EXTEND FROM [n21]
EXTEND FROM [n25, n10]

EXTEND FROM [n26, n16, n4]

EXTEND FROM [n27, n22, n4]

EXTEND FROM [n11]
EXTEND FROM [n17]

MINIMUM COST PATH GENERATED
ACCORDING TO EMBODIMENT OF THE INVENTION

EXTEND FROM [n7]

EXTEND FROM [n8, n13]
EXTEND FROM [n2, n14]

EXTEND FROM [n9, n19]

EXTEND FROM [n15, n20]

EXTEND FROM [n21]

EXTEND FROM [n10, n24]

EXTEND FROM [n16]

EXTEND FROM [n22, n27]

EXTEND FROM [n11]
EXTEND FROM [n28]

EXTEND FROM [n17]

EXTEND FROM [n17]

PATH PLANNING DEVICE AND METHOD, COST EVALUATION DEVICE, AND MOVING BODY

This is a 371 national phase application of PCT/JP2008/062543 filed 4 Jul. 2008, claiming priority to Japanese Patent Application No. JP 2007-187100filed 18 Jul. 2007, the contents of which are incorporated herein by reference.

TECHNICAL FIELD

The present invention relates to a path planning device and a path planning method for selecting a minimum cost path among paths from a start point to an end point, which are included in an area represented by a grid, a cost evaluation device for use in cost evaluation carried out in the path planning device, and a moving body having the path planning device mounted thereon.

BACKGROUND ART

As a conventional path search device, Patent Document 1 discloses a path planning system for a mobile robot, in which a path for a mobile robot to move from a starting point to a destination is obtained. The path planning system includes: grid map generation means that generates a grid map showing the distribution of spaces occupied by an object, which represents positions and postures in terms of probability, by using a geometric map for the object within an environment; Voronoi diagram generation means that generates a Voronoi diagram using distances according to the uncertainty of the positions and postures of the object, based on the generated grip map; and path search means that searches for a path from a given starting point to a destination, assuming that the possibility of collision with the object and a path length are expressed as costs on the generated Voronoi diagram.

In this configuration, the Voronoi diagram is generated using distances according to the uncertainty of the positions and postures of the object, and the path search is performed by calculating the costs on the weighted Voronoi diagram thus generated, thereby generating a safer path than that obtained by the conventional Voronoi diagram.

As described above, as a conventional path planning technology, a technology is known in which a movement space is approximated in a grid pattern to evaluate the cost of each path connecting grid points adjacent to each other, as disclosed in the above-mentioned Patent Document 1. In such a path search system, the searched path is represented as an assembly of segments each connecting grid points adjacent to each other. Accordingly, the cost of each path is evaluated as the sum of segments.

[Patent Document 1]
Japanese Unexamined Patent Application Publication No. 2005-32196

DISCLOSURE OF INVENTION

Technical Problems

Here, if the cost evaluation is performed based on only the segment length, there may be multiple shortest paths when the shortest path search is carried out. FIG. 7F is a diagram showing the shortest distance from the start to the goal. FIGS. 7A to 7E are diagrams each showing the shortest distance in the case where grid points are connected to each other. There is no difference in cost among five paths shown in FIGS. 7A to 7E. The ideal path shown in FIG. 7F is a path connecting the start and the goal with a straight line. Among the five paths shown in FIGS. 7A to 7E, the path shown in FIG. 7E is close to the ideal path. In the conventional path search system, however, the paths shown in FIGS. 7A to 7D are selected in some cases. When the path search system is mounted on a robot, for example, there is a problem in that the robot exhibits an unnatural movement.

That is, in a search space discretized in a grid pattern, the path length is represented as the simple sum of segments connecting the grid points, which makes it impossible to recognize that the segment connecting two given points is optimal. Accordingly, in the conventional path search system, the paths shown in FIGS. 7A to 7E have the same length, with the result that not the path shown in FIG. 7E but the paths shown in FIGS. 7A to 7D are generated. Thus, the conventional path search system has a problem in that the angular resolution of the path is low and it is impossible to search for the grid path that is close to the ideal shortest path.

The present invention has been made to solve the above-mentioned problems, and therefore an object of the present invention is to provide a path search device and a path search method which are capable of generating an optimal path in a search space represented by a grid, a cost evaluation device for generating the optimal path for use in the path search device, and a moving body having the path search device mounted thereon.

Technical Solution

According to the present invention, there is provided a path search device that selects a minimum cost path among paths from a start point to an end point, which are included in an area represented by a grid, the path search device including: a path cost calculation section that calculates a cost of a path from the start point to the end point, assuming that each grid point is a node and that, when a node obtained by tracing back a predetermined number of nodes from a focus node of current interest in a direction toward the start point along the path is a reference node, a cost of an edge extending from the focus node to a neighboring node adjacent to the focus node is a value given by (a first distance representing a shortest distance from the reference node to the neighboring node)−(a second distance representing a shortest distance from the reference node to the focus node); and a path determination section that determines a path according to the cost of the path.

According to the present invention, instead of simply setting the cost of the edge extending from the focus node to the neighboring node as a distance, the cost is obtained based on the first distance from the reference node to the neighboring node (end node which is located at the end of the edge) and based on the second distance from the reference node to the focus node (root node which is located at the root of the edge). The reference node is a node obtained by tracing back one node from the focus node, and the cost of the edge is calculated based on the shortest distance among a plurality of nodes. Accordingly, compared to the case of evaluating the costs uniformly as the distance of each edge, more detailed cost evaluation can be made based on the pattern of the edges, and the angular resolution of the path is improved, thereby enabling the generation of the path that is close to the ideal shortest distance.

Further, the path cost calculation section can calculate the cost of the path from the start point to the end point as the sum of the costs of the edges constituting the path. The path cost can be obtained not simply as the distance but as the sum total of edge costs given by (the first distance–the second distance).

Further, the path cost calculation section can calculate the cost from the start point to the end point by referring to the database storing the first distance and the second distance, or the cost given by (the first distance –the second distance). Reference of the database enables speeding-up of the path cost calculation.

Furthermore, the path search device can include a database generation section that constructs the database by calculating (the first distance–the second distance), and the database can be generated while executing the path search, for example.

Further, the path search device can include: an edge generation section that generates edges extending to neighboring nodes located at least forward, diagonally forward right, and diagonally forward left of a focus node, assuming that a minimum cost node among end nodes each located at an end of the edges is the focus node, when a cost from the start point to a given node is a cost of the given node; and an edge cost calculation/readout section that calculates the first distance and the second distance or reads out the first distance and the second distance from a database. The path cost calculation section can calculate a cost of a path from the start point to each of the neighboring nodes as a sum of costs of edges constituting the path. The path determination section can select a path having a minimum cost from the start point to the end point, when the neighboring node corresponds to the end point. Thus, each edge is generated from the focus node, and the cost of each edge is obtained, thereby making it possible to obtain the sum total of the costs of the edges constituting the path as the path cost.

Further, the edge generation section can extend edges to eight neighboring nodes adjacent to the start point, when the focus node corresponds to the start point. Thus, it is possible to extend edges even if the position of the end point with respect to the start point is unknown. Note that it is also possible to extend edges from the start point only in a direction close to the end point.

Furthermore, the edge cost calculation/readout section can set the cost of the edge extending from the focus node to the neighboring node as a distance between the focus node and the neighboring node, before the number of nodes from the start point to the neighboring node reaches the predetermined number, and can set the cost of the node as a distance unless the number of nodes reaches the predetermined number.

Likewise, the path cost calculation section can set the cost of the adjacent node as the sum of distances of the edges constituting the path from the start point to the neighboring node, before the number of nodes from the start point to the neighboring node reaches the predetermined number.

According to the present invention, there is provided a cost evaluation device for use in path search for selecting a minimum cost path among paths from a start point to an end point, which are included in an area represented by a grid, the cost evaluation device including: a distance preparation section that calculates a first distance representing a shortest distance from a reference node to a neighboring node, and a second distance representing a shortest distance from the reference node to a focus node of current interest, or reads out the first distance and the second distance from a database, assuming that each grid point is a node; a node obtained by extending an edge from the focus node is the neighboring node; and a node obtained by tracing back a predetermined number of nodes from the focus node in a direction toward the start point along a path is the reference node; and an edge cost calculation section that calculates a cost of an edge extending from the focus node to the neighboring node as a value given by (the first distance–the second distance).

According to the present invention, there is provided a path search method of selecting a minimum cost path among paths from a start point to an end point, which are included in an area represented by a grid, the path search method including: a path cost calculation step of calculating a cost of a path from the start point to the end point, assuming that each grid point is a node and that, when a node obtained by tracing back a predetermined number of nodes from a focus node of current interest in a direction toward the start point along the path is a reference node, a cost of an edge extending from the focus node to a neighboring node adjacent to the focus node is a value given by (a first distance representing a shortest distance from the reference node to the neighboring node)–(a second distance representing a shortest distance from the reference node to the focus node); and a path determination step of determining a path according to the cost of the path.

According to the present invention, there is provided a path search method of selecting a minimum cost path among paths from a start point to an end point, which are included in an area represented by a grid, the path search method including: a first step of extending edges to eight neighboring nodes adjacent to the start point assuming that each grid point is a node, and calculating a distance from the start point to each of the neighboring nodes as a cost of the neighboring node; a second step of extending edges to neighboring nodes located at least forward, diagonally forward right, and diagonally forward left of a focus node, assuming that a minimum cost node among end nodes each located at an end of the edges is the focus node, when a cost from the start point to one node is a cost of the one node, and calculating a cost of each of the neighboring nodes; a third step of selecting a path having a minimum cost from the start point to the end point, when the neighboring node corresponds to the end point; and repeating the second step until the neighboring node reaches the end point. The second step includes: a distance preparation step of calculating a first distance representing a shortest distance from a reference node to the neighboring node, and a second distance representing a shortest distance from the reference node to the focus node, or reading out the first distance and the second distance from a database, assuming that a node obtained by tracing back a predetermined number of nodes from the focus node in a direction toward the start point along a path is the reference node; an edge cost calculation step of calculating a cost of an edge extending from the focus node to the neighboring node as a value given by (the first distance–the second distance); and a path cost calculation step of calculating a cost of a path from the start point to the neighboring node as a sum of costs of edges constituting the path.

According to the present invention, the edge cost is calculated by (the first distance–the second distance), and the processing is repeated while increasing edges until the neighboring node reaches the end point. Thus, the costs obtained in the path search can be correctly evaluated, which leads to an improvement of the angular resolution of the path.

According to the present invention, there is provided a moving body including: moving means; drive means that drives the moving means; path search means that selects a minimum cost path among paths from a start point to an end point, which are included in a grid space obtained by representing a surrounding environment by a grid; and control means that controls the drive means based on a result of path search carried out by the path search means. The path search means includes: path cost calculation means that calculates a cost of a path from the start point to the end point, assuming that each grid point is a node and that, when a node obtained by tracing back a predetermined number of nodes from a focus node of current interest in a direction toward the start point along the path is a reference node, a cost of an edge extending from the focus node to a neighboring node adjacent to the focus node is a value given by (a first distance representing a shortest distance from the reference node to the neighboring node)−(a second distance representing a shortest distance from the reference node to the focus node); and path determination means that determines a path according to the cost of the path.

According to the present invention, compared to the case where the path search means evaluates the costs uniformly as the distance of each edge, the angular resolution of the path is improved by the more detailed cost evaluation based on the pattern of the edges, and a more ideal path that is close to the shortest distance can be generated. This enables the moving body to exhibit a more natural movement operation.

ADVANTAGEOUS EFFECTS

According to the present invention, it is possible to provide a path search device and a path search method which are capable of generating an optimal path in a search space represented by a grid, a cost evaluation device for generating an optimal path for use in the path search device, and a moving body having the path search device mounted thereon.

EXPLANATION OF REFERENCE

1 ROBOT
2 HEAD UNIT
3a, 3b ARM UNIT
4a, 4b LEG UNIT
5 TRUNK UNIT
6 IMAGING SECTION
12 IMAGE RECOGNITION MODULE
13 PATH SEARCH MODULE
14 BEHAVIOR DETERMINATION MODULE
15 VOICE RECOGNITION MODULE
20 PATH OUTPUT SECTION
21 EDGE GENERATION SECTION
22 EDGE COST CALCULATION/READOUT SECTION
22a DISTANCE PREPARATION SECTION
22b EDGE COST CALCULATION SECTION
23 PATH COST CALCULATION SECTION
24 PATH DETERMINATION SECTION
43 OBSTACLE
101 CONTROL SECTION
102 INPUT/OUTPUT SECTION
103 DRIVE SECTION
104 POWER SUPPLY SECTION
105 EXTERNAL STORAGE SECTION
121 CAMERA
122 BUILT-IN MICROPHONE
123 SPEAKER
125 SENSOR SECTION
131 MOTOR
132 DRIVER
141 BATTERY
142 BATTERY CONTROL SECTION

BEST MODES FOR CARRYING OUT THE INVENTION

Hereinafter, specific embodiments to which the present invention is applied will be described in detail with reference to the drawings. In this embodiment, the present invention is applied to a path search device mounted on a robot or the like.

The path search device according to this embodiment generates a grid path, which is as close to the ideal shortest distance as possible, by path searching in a grid-like search space. While consideration is given to a segment length of a path as well as passing points on the path, a cost of each edge (segment) in the path is evaluated. Here, a robot having such a path search device mounted thereon is first described.

Figure 1:
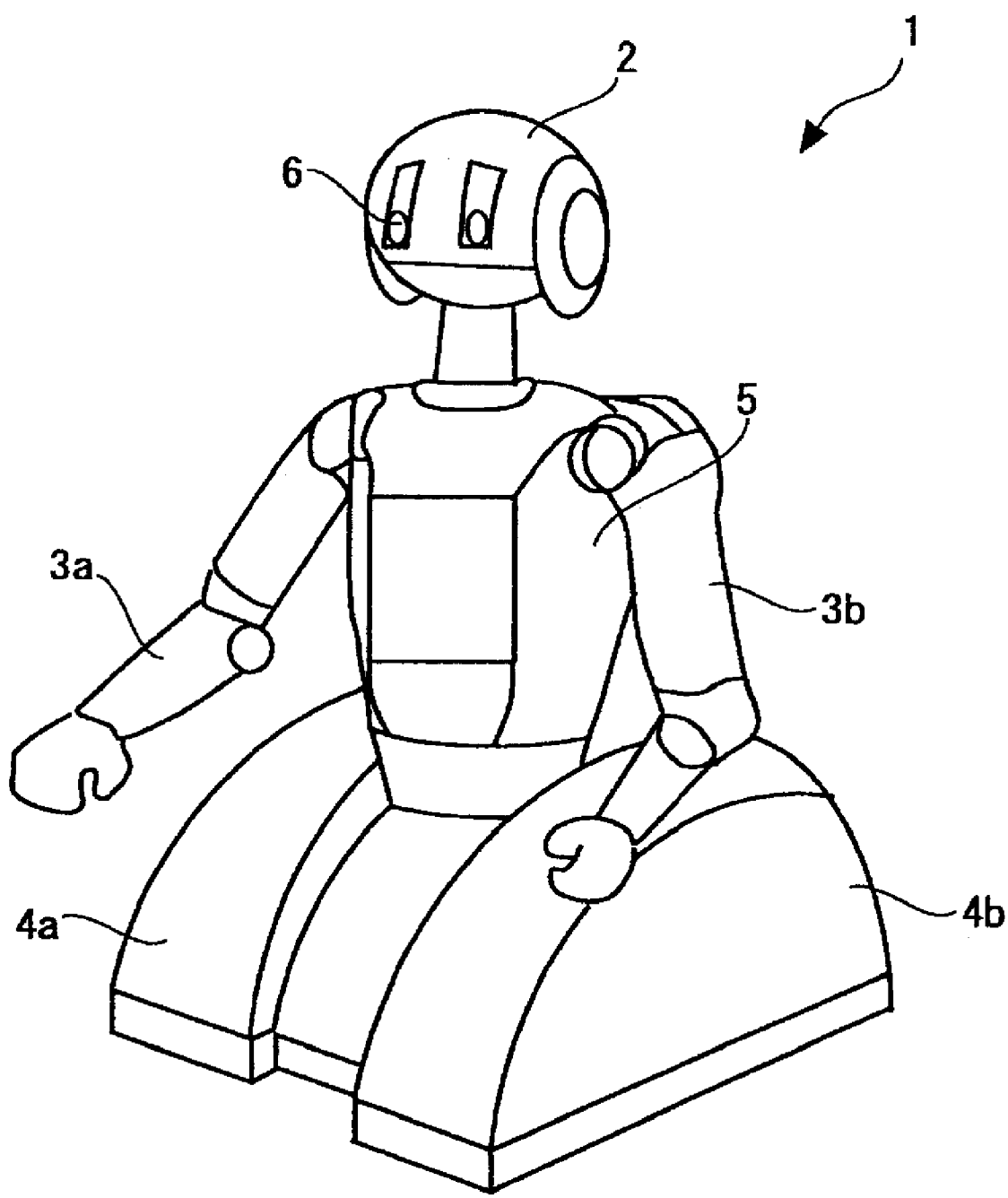
FIG. 1 is a perspective view showing a bipedal walking type robot according to an embodiment of the present invention.

FIG. 1 is a perspective view showing a robot according to an embodiment of the present invention. As shown in FIG. 1, a robot 1 includes a head unit 2, two right and left arm units 3a and 3b, and two right and left leg units 4a and 4b, each of which is coupled to a predetermined position of a trunk unit 5. The robot 1 according to this embodiment is structured to be movable by means of wheels which are respectively incorporated in the leg units 4a and 4b. Note that the robot may be a bipedal or quadrupedal walking type robot.

The head unit 2 includes an imaging section 6, and thus is capable of taking images of surroundings within a predetermined range. Further, the head unit 2 is provided with a microphone, a speaker, and the like, which are not shown, and thus is capable of recognizing an utterance of a user and responding to the utterance. The head unit 2 is connected to the trunk unit 5 so as to be rotatable in the horizontal direction in a plane parallel to a floor surface. The head unit 2 is rotated to change an imaging range depending on the situation, thereby making it possible to take images of the surrounding environment.

An arithmetic processing section which is included in a control section incorporated in the trunk unit 5 controls the amount of driving force to joint portions included in the arm units 3a and 3b and to the wheels included in the leg units 4a and 4b, according to a predetermined control program, and determines a joint driving angle of each joint and a rotation angle of each wheel, with the result that the arm units 3a and 3b and the leg units 4a and 4b take any desired position and posture.

Figure 2:
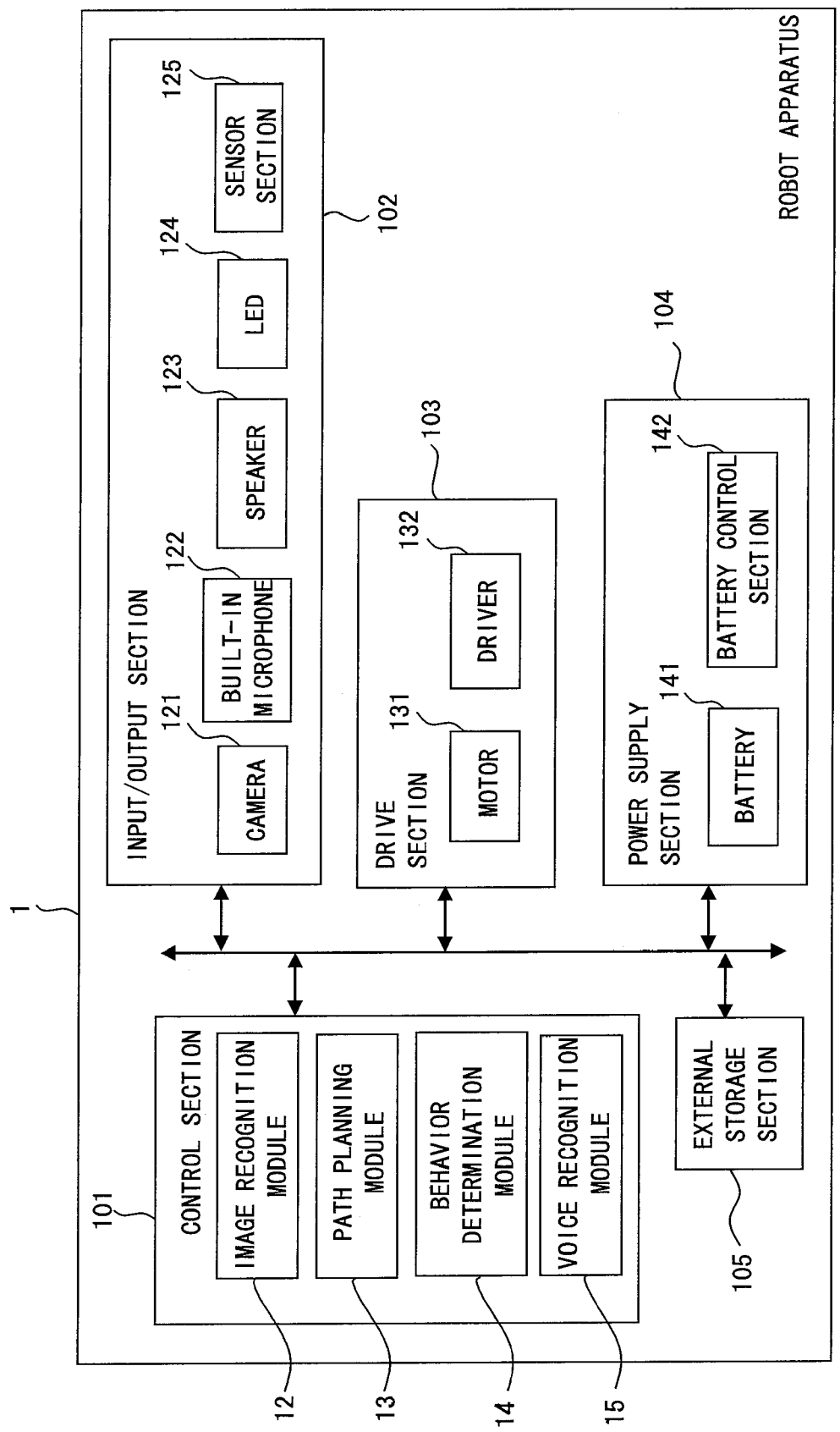
FIG. 2 is a block diagram showing the robot according to an embodiment of the present invention.

FIG. 2 is a block diagram showing the robot according to this embodiment. The robot 1 includes a control section 101, an input/output section 102, a drive section 103, a power supply section 104, and an external storage section 105.

The input/output section 102 includes: a camera 121 including a charge coupled device (CCD) for picking up images of the surroundings; one or a plurality of built-in microphones 122 for collecting ambient sounds; a speaker 123 for outputting a voice and having a conversation with the user, for example; an LED 124 for responding to the user and expressing feelings or the like; and a sensor section 125 including a touch sensor.

Further, the drive section 103 includes a motor 131 and a driver 132 that drives the motor, and causes the leg units 4a and 4b and the arm units 3a and 3b to operate in response to an instruction or the like from the user. The power supply section 104 includes a battery 141 and a battery control section 142 that controls charge/discharge thereof, and supplies power to each section.

The external storage section 105 includes an HDD, an optical disk, and a magnet-optical disk, which are detachably mounted, to store various programs, control parameters, and the like, and supplies the programs and data to a memory (not shown) and the like provided in the control section 101, as needed.

The control section includes a central processing unit (CPU), a read only memory (ROM), a random access memory (RAM), and an interface for wireless communication, and controls various operations of the robot 1. The control section 101 includes: an image recognition module 12 that analyzes the images obtained by the camera 121, according to a control program stored in the ROM, for example; a path search module 13 that performs a path search based on an image recognition result; a behavior determination module 14 that selects a behavior to be executed based on various recognition results; and a voice recognition module 15 that performs voice recognition. Particularly in this embodiment, the path search module 13 generates a search path that is close to the ideal path, and the drive section 103 is controlled based on the generated path. Thus, the robot 1 exhibits a more natural movement.

Here, in the robot 1 according to this embodiment, the path search module 13 approximates a movement space in a grid-like form, and searches for a path to be taken. Next, the path search module according to this embodiment is described in detail.

Figure 3:
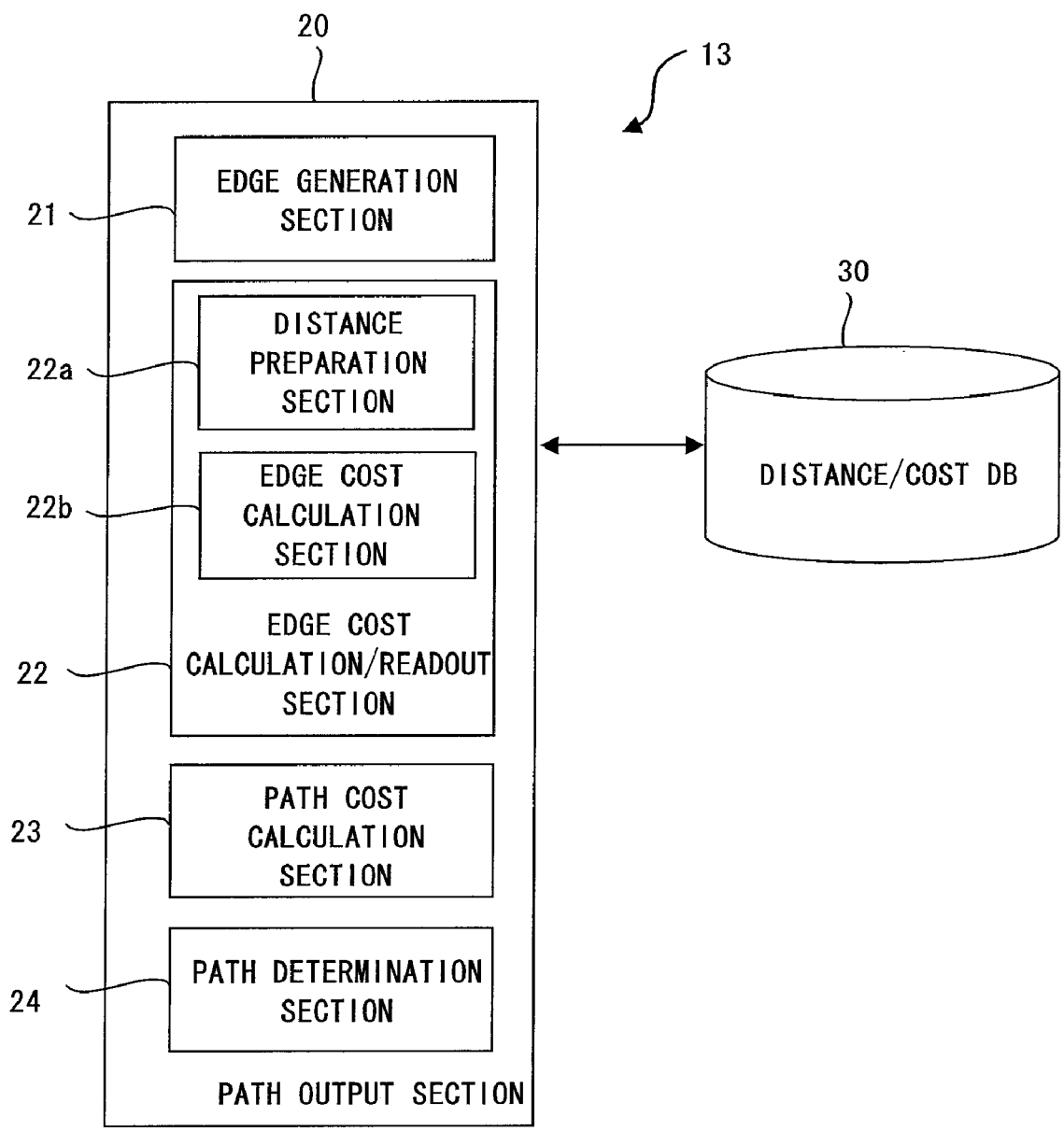
FIG. 3 is a diagram showing details of a path search module according to an embodiment of the present invention.

FIG. 3 is a diagram showing details of the path search module according to this embodiment. The path search module 13 includes a path output section 20 and a distance/cost database (DB) 30. The distance/cost DB 30 stores costs from one grid point to another grid point and distances between grid points, which are calculated in advance. Particularly in this embodiment, when it is assumed that each grid point is a node; a node to which an edge extends from a focus node of current interest is a neighboring node; and a node obtained by tracing back a predetermined number of nodes from the focus node in a direction toward the start point along the path is a reference node, a first distance representing the shortest distance from the reference node to a neighboring node, and a second distance representing the shortest distance from the reference node to the focus node are stored. Thus, a cost of an edge extending from the focus node to the neighboring node can be obtained based on the first distance from the reference node to the neighboring node (end node which is located at the end of the edge) and the second distance from the reference node to the focus node (root node positioned at the root of the edge). The reference node is a node obtained by tracing back a predetermined number of nodes from the focus node. Since the cost of each edge is calculated based on the shortest distance among a plurality of nodes, more detailed cost evaluation can be made based on a pattern of edges, compared to the case of evaluating costs uniformly as a distance of each edge, and the angular resolution of the path is improved, which results in generation of the path that is closer to the ideal shortest distance.

The path output section 20 includes an edge generation section 21, an edge cost calculation/readout section 22, a path cost calculation section 23, and a path determination section 24. Note that, in this embodiment, a description is given assuming that the distance/cost DB 30 storing the costs and distances is provided and that the path output section 20 refers to the data as necessary to carry out a path search. Alternatively, the path output section 20 may calculate the costs and distances as needed. Further, the distance/cost DB 30 can be constructed by the edge cost calculation/readout section 22 and the path cost calculation section 23 of the path output section 20.

Here, in this embodiment, each time a new environment is recognized, the environment is recognized as a search space represented by a grid. Further, a problem with a robot apparatus is reduced to a problem of searching assuming that each grid point is a node, and an optimal path can be obtained by well-known algorithms such as Dijkstra's algorithm, A* search, and DP matching. In this case, the distance between nodes and the cost thereof are calculated and registered in the distance/cost DB 30. Note that, when the robot detects a new environment, a distance between nodes and a cost thereof in the environment may be input from the outside. Further, processings such as edge generation, edge cost readout/calculation, path cost calculation, and path determination are carried out at rates in a range from once every several milliseconds to once every several seconds, and a path is generated at each of the timings. Note that it is assumed that obstacle information and the like are input as information from the image recognition module and the sensor at each of the timings. Each block is described in detail below.

Figure 4:
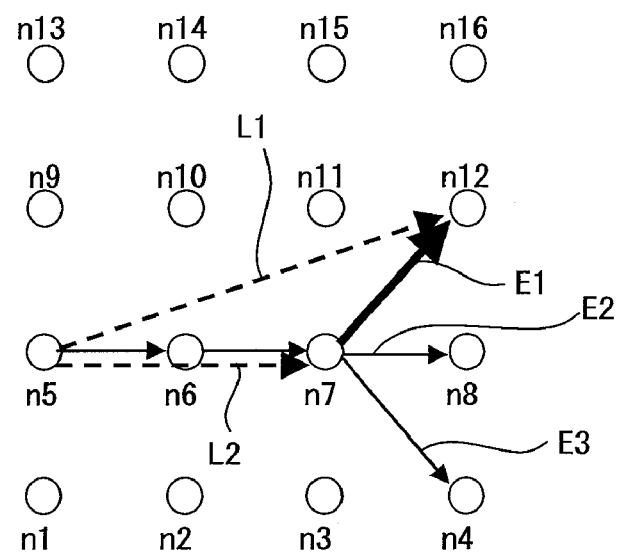
FIG. 4 is a pattern diagram for explaining edges for use in path determination processing of a path determination device according to an embodiment of the present invention, and costs thereof.
Figure 5:
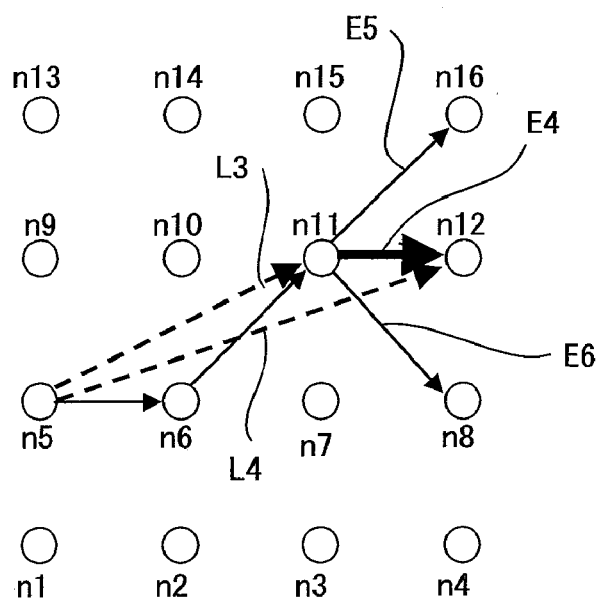
FIG. 5 is also a pattern diagram for explaining edges for use in path determination processing of a path determination device according to an embodiment of the present invention, and costs thereof.

When a cost from the start point to one node is set as a cost of the one node, it is assumed that a node having a minimum cost among end nodes, each of which is located at the end of each edge, is a focus node, and the edge generation section 21 generates edges extending to neighboring nodes which are positioned at least forward, diagonally forward right, and diagonally forward left of the focus node. Here, the term "forward" means a direction of an edge entering the focus node. FIGS. 4 and 5 are pattern diagrams for explaining edges and costs thereof.

The edge generation section 21 generates edges in three directions, i.e., forward, diagonally forward right, and diagonally forward left of the node of interest. FIGS. 4 and 5 each show 4×4 grid points (n1 to n16). In FIG. 4, when the node of interest corresponds to the node n7, a direction from the node n6 to the node n7 is set as the forward direction. Accordingly, a forward node corresponds to the node n8; a diagonally forward right node corresponds to the node n4; and a diagonally left node corresponds to the node n12. The edge generation section 21 generates edges extending from the node n7 to the nodes n4, n8, and n12. Here, as described later, when the focus node corresponds to the start point, edges are generated for all the eight neighboring nodes that are adjacent to each other vertically, horizontally, and diagonally, instead of generating edges in three directions. Note that, in this embodiment, a description is given assuming that edges are generated only in three directions, i.e., forward, diagonally forward right, and diagonally forward left directions for the nodes other than the start point, but edges may be generated for all the eight adjacent neighboring nodes with respect to all the nodes. Alternatively, for example, five edges extending to the forward, diagonally forward right, and diagonally forward left nodes as well as right-hand and left-hand nodes may be generated. When the edges are generated only in three directions as in this embodiment, the amount of calculation is reduced, which leads to speeding-up of processing. Further, though the edges extending from the start point to all the eight adjacent neighboring nodes are generated in this embodiment, a direction from the start point to the end point may be determined to generate edges for a part of neighboring nodes located in directions that are close to the direction thus determined.

Here, assuming that the minimum cost node among the nodes described later is a focus node, the edge generation section 21 generates edges extending from the focus node to three neighboring nodes. The term "cost" of each node herein refers to a cost from the start point to the node. After edges are generated, a node having a least node cost among node costs of all the end nodes extending from currently existing edges is selected, and edges are generated in a similar manner. Such processing is repeated.

The edge cost calculation/readout section 22 includes: a distance preparation section 22a that calculates the first distance representing the shortest distance from the reference node to the neighboring node and the second distance representing the shortest distance from the reference node to the focus node, or reads out the first and second distances from the database; and an edge cost calculation section 22b that calculates the cost of each edge extending from the focus node to the neighboring node as given by (the first distance−the second distance). Note that the edge cost may be calculated in advance with respect to each pattern and may be stored in the distance/cost DB 30. In this case, it is not necessary to provide the edge cost calculation section 22b.

Figure 6A:
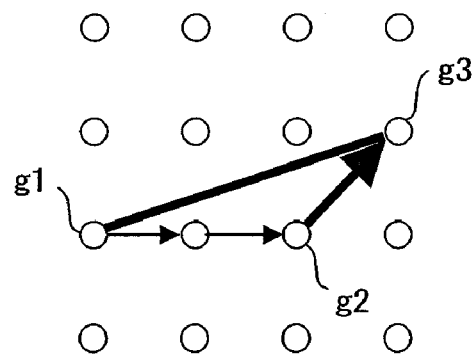
FIG. 6A is a diagram showing the shape of edges in the case of tracing back two edges.
Figure 6B:
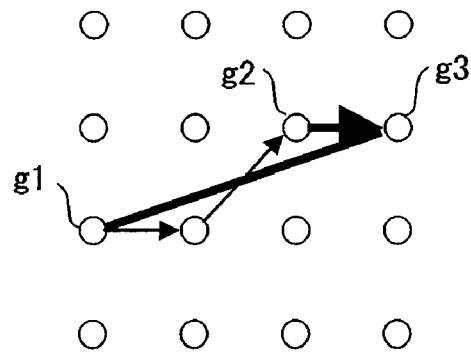
FIG. 6B is a diagram showing the shape of edges in the case of tracing back two edges.
Figure 6C:
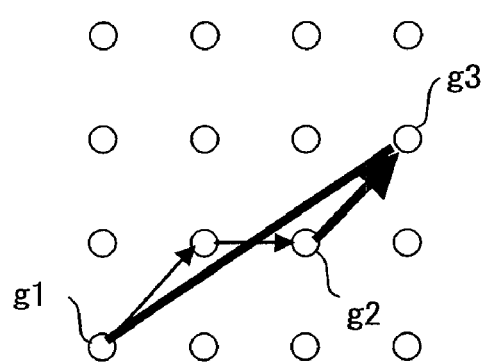
FIG. 6C is a diagram showing the shape of edges in the case of tracing back two edges.
Figure 6D:
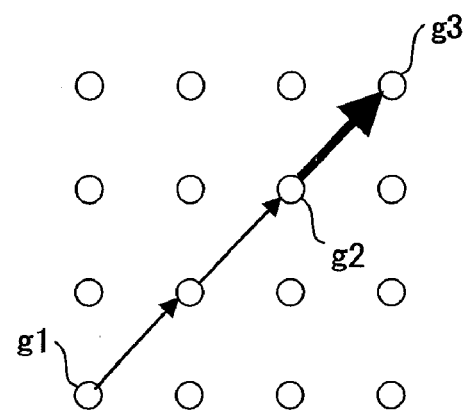
FIG. 6D is a diagram showing the shape of edges in the case of tracing back two edges.
Figure 6E:
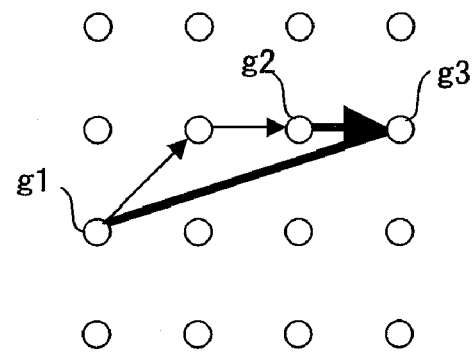
FIG. 6E is a diagram showing the shape of edges in the case of tracing back two edges.
Figure 6F:
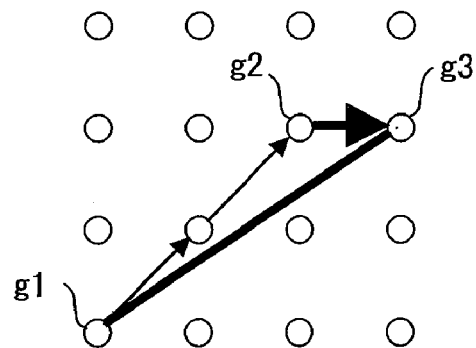
FIG. 6F is a diagram showing the shape of edges in the case of tracing back two edges.
Figure 6G:
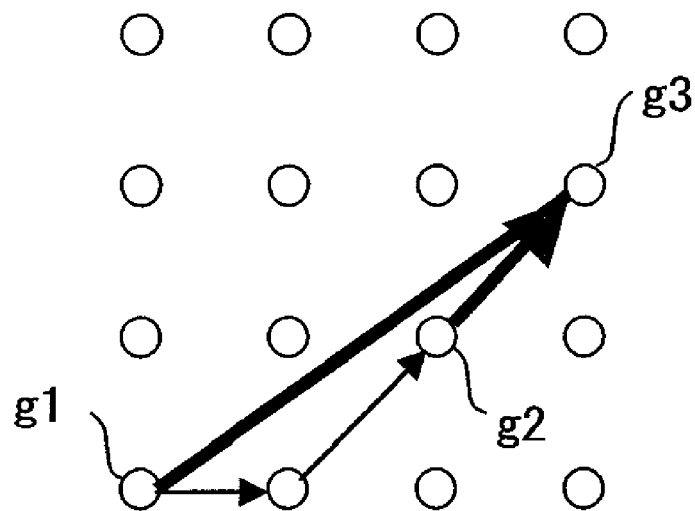
FIG. 6G is a diagram showing the shape of edges in the case of tracing back two edges.
Figure 6H:
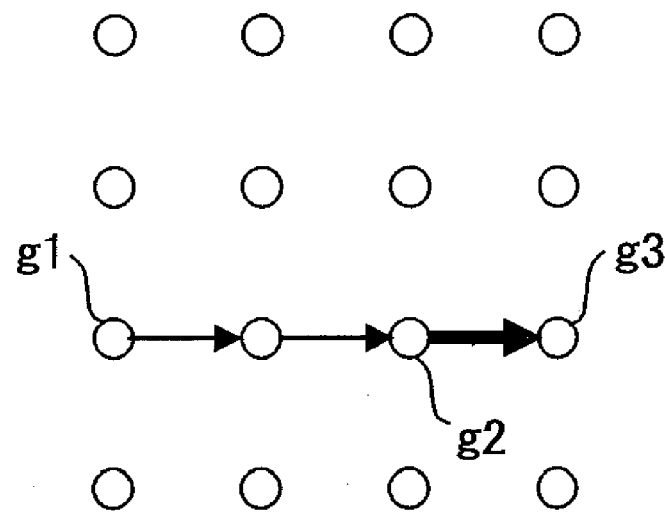
FIG. 6H is a diagram showing the shape of edges in the case of tracing back two edges.

Next, a description is given of a method of calculating an edge cost stored in the distance/cost DB 30. Conventionally, only the edge length is simply used in the case of evaluating the edge cost. Meanwhile, in this embodiment, the edge cost is evaluated (calculated) using the shape of each edge of a path reaching a node of interest. The pattern of the edge shape depends on how many edges are traced back and evaluated. As the path length to be evaluated is increased (the number of edges is increased), the angular resolution of the path, which is described later, is improved. FIGS. 6A to 6H are diagrams each showing the shape of edges in the case of tracing back two edges. In this case, since the total number of edges is three, $2^3=8$ edge patterns are obtained. Note that costs shown in FIGS. 6A to 6C and FIGS. 6E to 6G are different from costs calculated using the conventional method, and the costs shown in FIGS. 6D and 6H are the same as the costs obtained by the conventional method. As shown in FIGS. 6A to 6H, there are eight path patterns each representing an end node (neighboring node) g3 of an edge extending from a node g2 of interest. Here, the node obtained by tracing back a predetermined number of nodes from the node g2 in the direction toward the start point along the path is set as a reference node. While, in this example, the node g1 which is obtained by tracing back two nodes (edges) is set as the reference node. The cost of the focus node g2→the end node g3 can be obtained based on a distance from the reference node g1 to the end node g3 and a distance from the reference node g1 to the focus node g2. Note that, though the case of tracing back two edges is described in this embodiment, it is possible to trace back three edges or more, or only one edge.

The calculation of each edge cost is described in detail. When it is assumed that the node n7 shown in FIG. 4 is a focus node and the nodes n12, n8, n4 are end nodes of the edges each extending from the node n7, edges E1, E2, and E2 are generated from the node n7 by the edge generation section 21. Here, a description is given of a method of calculating the cost of the edge E1 of n7→n12.

As described above, the reference node corresponds to the node n5 which is obtained by tracing back two edges from the node n7. A distance L1 from the reference node n5 to the node n12, which is the end of the edge, is read out from the distance/cost DB 30. The distance L1 represents the shortest distance between the nodes n5→n12. The distance is defined as the first distance. Note that the description given herein is based on the assumption that each distance between nodes is 1. In this example, the distance L1 is given by $\sqrt{(3^2+1^2)}=\sqrt{(10)}\approx 3.16$.

Next, a distance L2 from the reference node n5 to the focus node n7, which is the root of the edge, is read out from the distance/cost DB 30. The distance L2 represents the shortest distance between the nodes n5→n7. The distance is defined as the second distance. In this example, the distance L2 is "2". Then, (cost of edge E1)=(first distance L1)−(second distance L2)=3.16−2=1.16 is satisfied.

The costs of the other edges E2 and E3 can be obtained in a similar manner. Specifically, the cost of the edge E2 is given by {distance from reference node n5 to end node n8 of edge E2 (first distance)}−{distance from reference node n5 to root node n7 of edge E2 (second distance)}=3−2=1. Further, the cost of the edge E3 is given by {distance from reference node n5 to end node n4 of edge E3 (first distance)}−{distance from reference node n5 to root node n7 of edge E3 (second distance)}=3.16−2=1.16.

Likewise, in FIG. 5, assuming that the node n5 which is obtained by tracing back two edges from the focus node n11 is the reference node, the cost of an edge E4 extending the focus node n11 to the node n12 is given by {distance from reference node n5 to end node n12 of edge E4 (first distance)}−{distance from reference node n5 to root node n11 of edge E2 (second distance)}=3.16−2.24=0.89.

Further, the cost of an edge E5 is given by {cost from reference node n5 to end node n16 of edge E5 (first distance)}−{distance from reference node n5 to root node n11 of edge E5 (second distance)}=3.61−2.24=1.37. Furthermore, the cost of an edge E6 is given by {distance from reference node n5 to end node n8 of edge E6 (first distance)}−{distance from reference node n5 to root node n11 of edge E6 (second distance)}=3−2.24=0.76.

The path cost calculation section 23 calculates the cost from the start point to the end node of each edge generated by the edge generation section 21. In this case, since the costs of the edges are stored in the distance/cost DB 30, the costs of edges may be read out and added to each other. For example, in the example shown in FIG. 4, the cost from the start point to the node n12 is represented by (cost from start point to reference node n5)+(cost of n5→n6)+(cost of n6→n7)+(cost of edge E1=1.16). Here, the cost between the nodes n5→n6 and the cost between the nodes n6→n7 vary depending on the reference node for the nodes n5 and n6. That is, unlike the conventional method, cost=distance=1 is not always established in a simple manner. Likewise, in the example shown in FIG. 5, the cost from the start point to the node n12 is given by (cost from start point to reference node n5)+(cost of n5→n6)+(cost of n6→n11)+(cost of n11→n12=0.89).

Figure 7A:
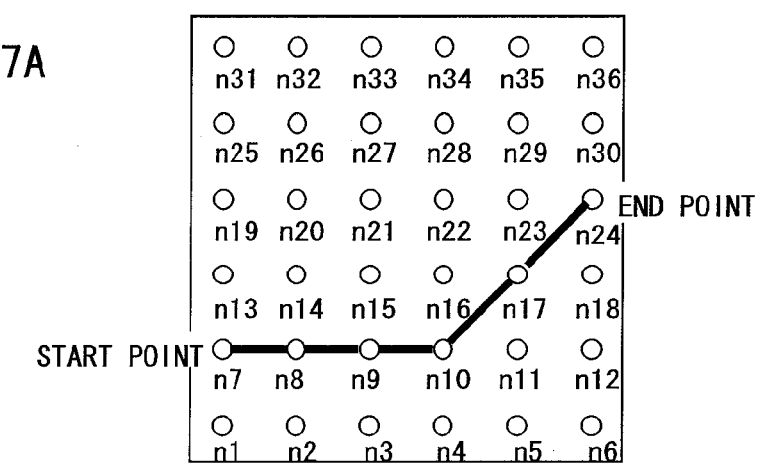
FIG. 7A is a diagram showing a path from a node n7 as a start point to a node n24 as an end point.
Figure 7B:
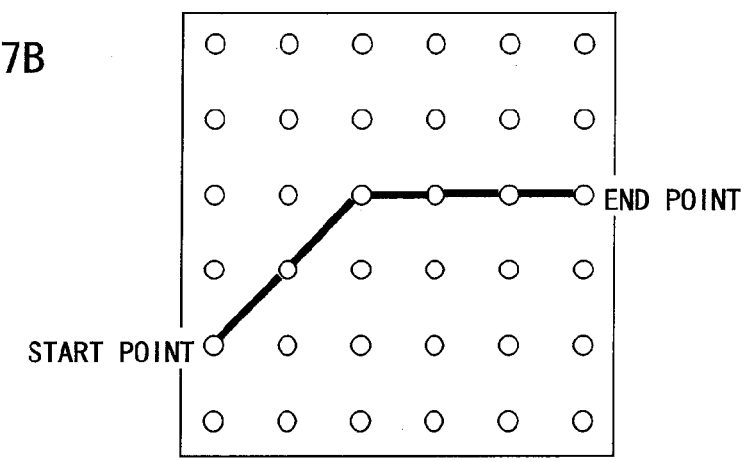
FIG. 7B is a diagram showing a path from the node n7 as the start point to the node n24 as the end point.
Figure 7C:
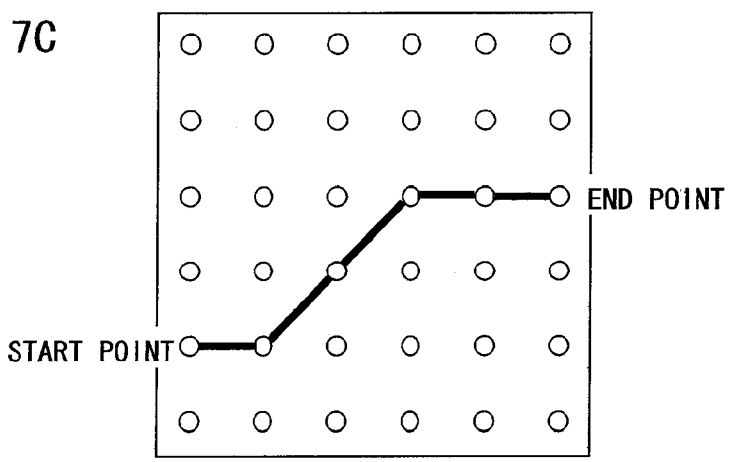
FIG. 7C is a diagram showing a path from the node n7 as the start point to the node n24 as the end point.
Figure 7D:
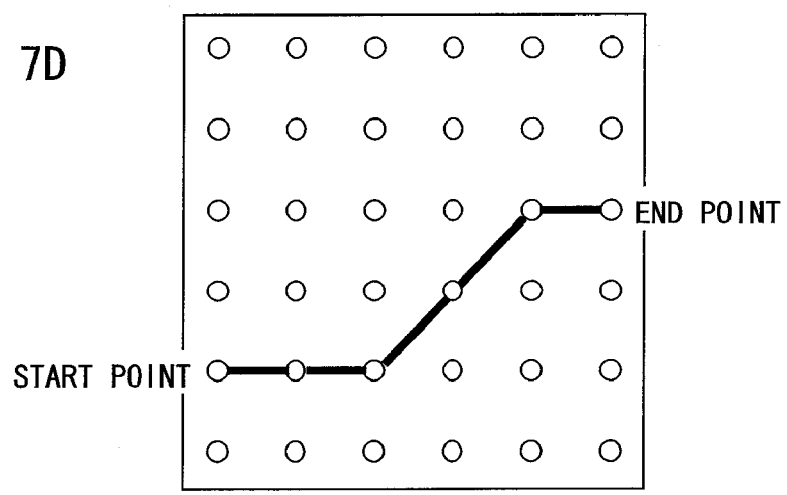
FIG. 7D is a diagram showing a path from the node n7 as the start point to the node n24 as the end point.
Figure 7E:
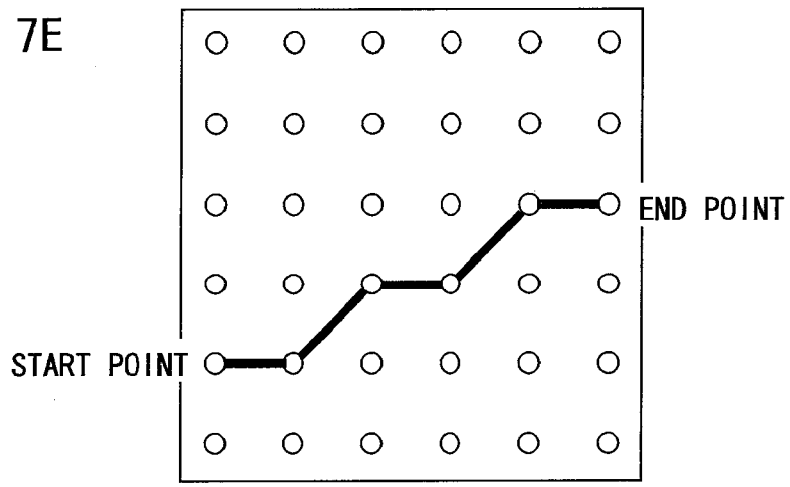
FIG. 7E is a diagram showing a path from the node n7 as the start point to the node n24 as the end point.
Figure 7F:
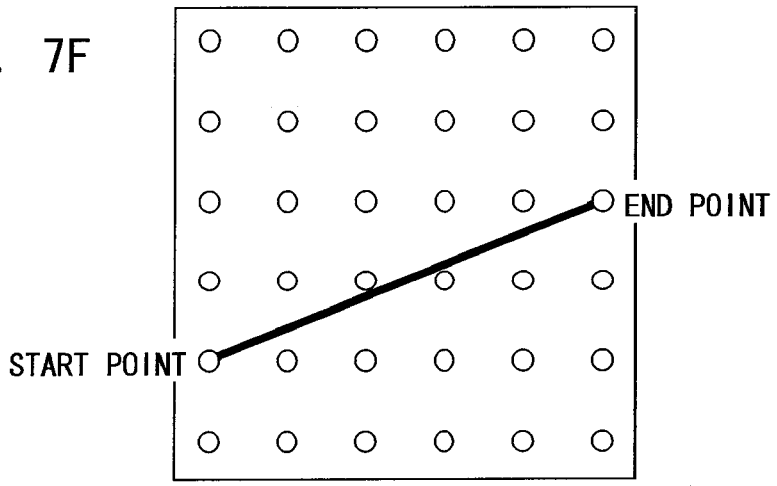
FIG. 7F is a diagram showing a path from the node n7 as the start point to the node n24 as the end point.

When the end node of the edge generated by the edge generation section 21 corresponds to the end point, the path determination section 24 selects a minimum cost path from the start point to the end point. FIGS. 7A to 7F are diagrams each showing a path from the node n7 as a start point to a node n24 as an end point. In FIGS. 7A to 7E, the same cost is obtained when the conventional cost calculation method is employed. Accordingly, the path determination section 24 selects a path deviating from the ideal paths as shown in FIGS. 7A to 7D in some cases. Meanwhile, the path shown in FIG. 7E is obtained as a minimum cost path as a result of the path calculation executed by the path cost calculation section 23 according to this embodiment. Here, among the paths from the node n7 to the node n24, the path shown in FIG. 7F, which is obtained by simply connecting these nodes with a straight line while ignoring the other nodes, is the ideal shortest path. In this embodiment, instead of simply setting the cost of each edge constituting the path as a distance, the cost is evaluated based on a difference between the distance from the reference node to the end node of the edge and the distance from the reference node to the root of the edge by tracing back to the reference node, thereby enabling selection of the path, as shown in FIG. 7E, which is closest to the ideal shortest path shown in FIG. 7F.

Next, a description is given of the resolution of the path generated as a result of the path search according to this embodiment. When the path is expressed using only edges connecting nodes, edges can be extended from a given node to eight adjacent neighboring nodes. In this case, an angle formed between the edges is 45° at minimum. Meanwhile, when the path is expressed using three edges while tracing back two edges as in this embodiment, four patterns are obtained within the range of 45° as shown in FIGS. 6H, 6B, 6C, and 6D. That is, a resolution of about $45/4 \approx 11.3°$ is obtained, which is four times as high as that obtained in the case of expressing the path using one edge. Thus, not the paths shown in FIGS. 7A to 7D but the path shown in FIG. 7E can be generated. As a result, a path with a turning angle of the robot being smaller than 45° can be generated. Accordingly, the robot can move smoothly without sharp turning.

Figure 8:
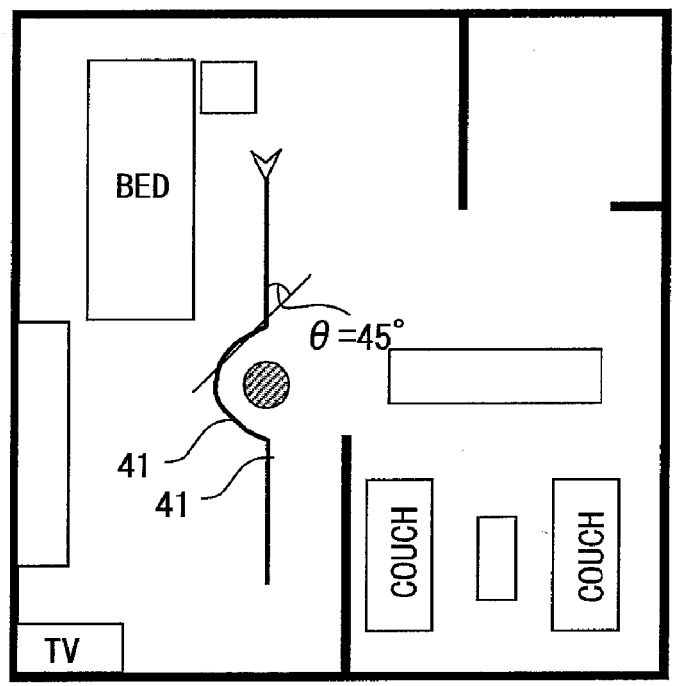
FIG. 8 is a diagram showing a movement path of a conventional robot.
Figure 9:
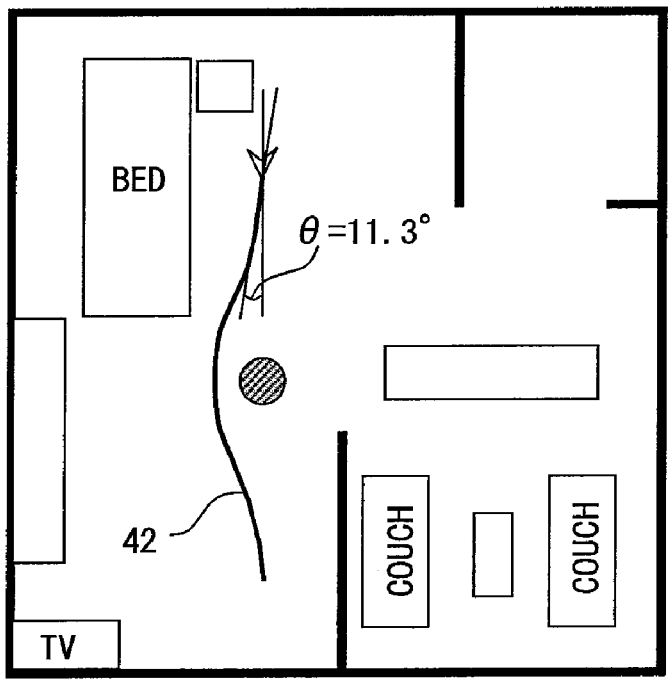
FIG. 9 is a diagram showing a movement path of a robot according to an embodiment of the present invention.

FIGS. 8 and 9 are diagrams showing a movement path of a conventional robot and a movement path of a robot according to this embodiment, respectively. As shown in FIG. 8, the conventional robot apparatus can only take paths for turning diagonally right or left by 45° or 90°. On the other hand, when it is assumed that the path can be expressed using three edges by tracing back two edges as in this embodiment, the robot can turn with two angles between 0 to 45°, that is, at about 11.3° and about 22.6° as shown in FIG. 9, and a smoothly curved path can be depicted, thereby enabling the robot apparatus to express a natural movement operation.

Figure 10:
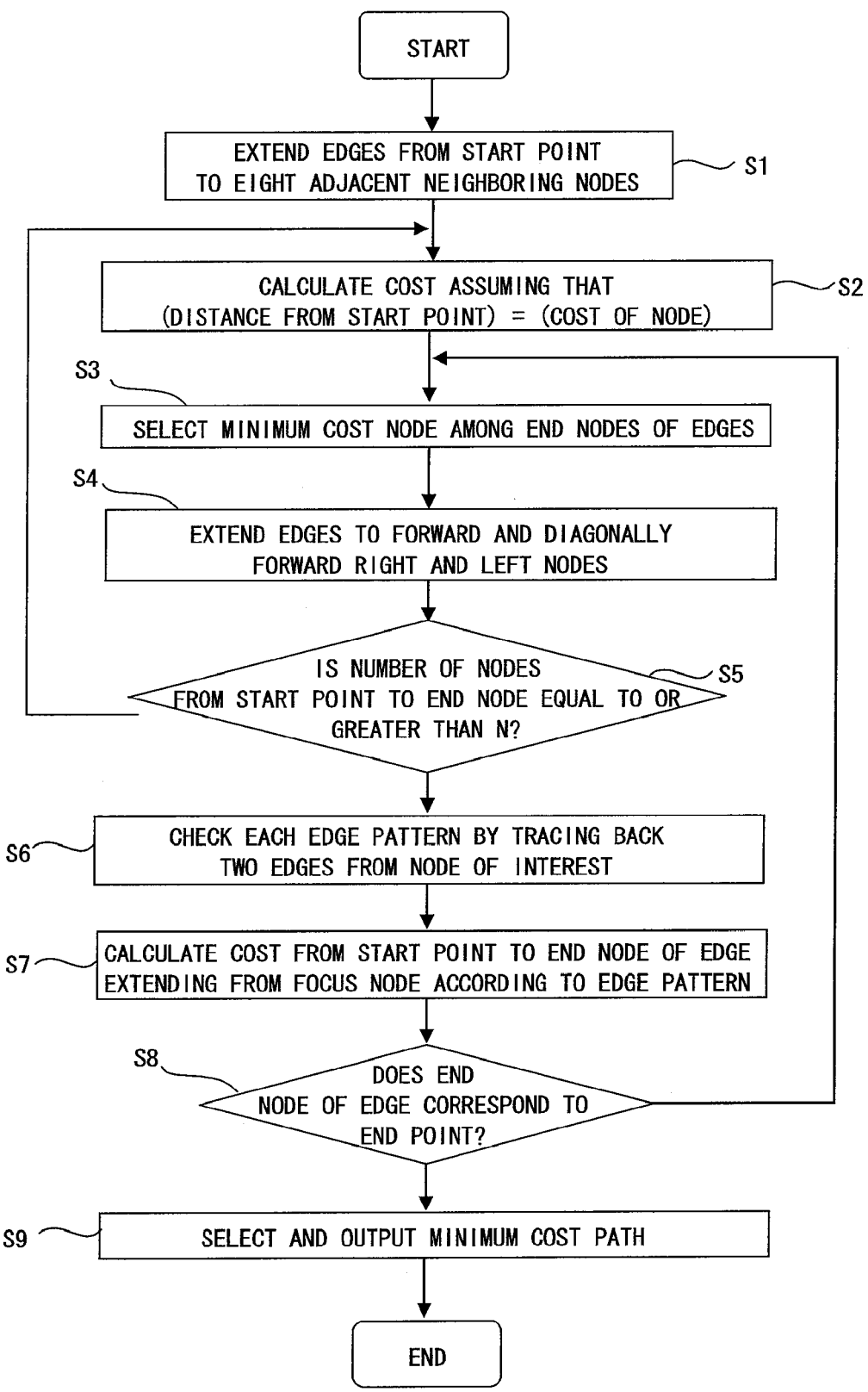
FIG. 10 is a flowchart showing a path determination method according to an embodiment of the present invention.
Figure 11:
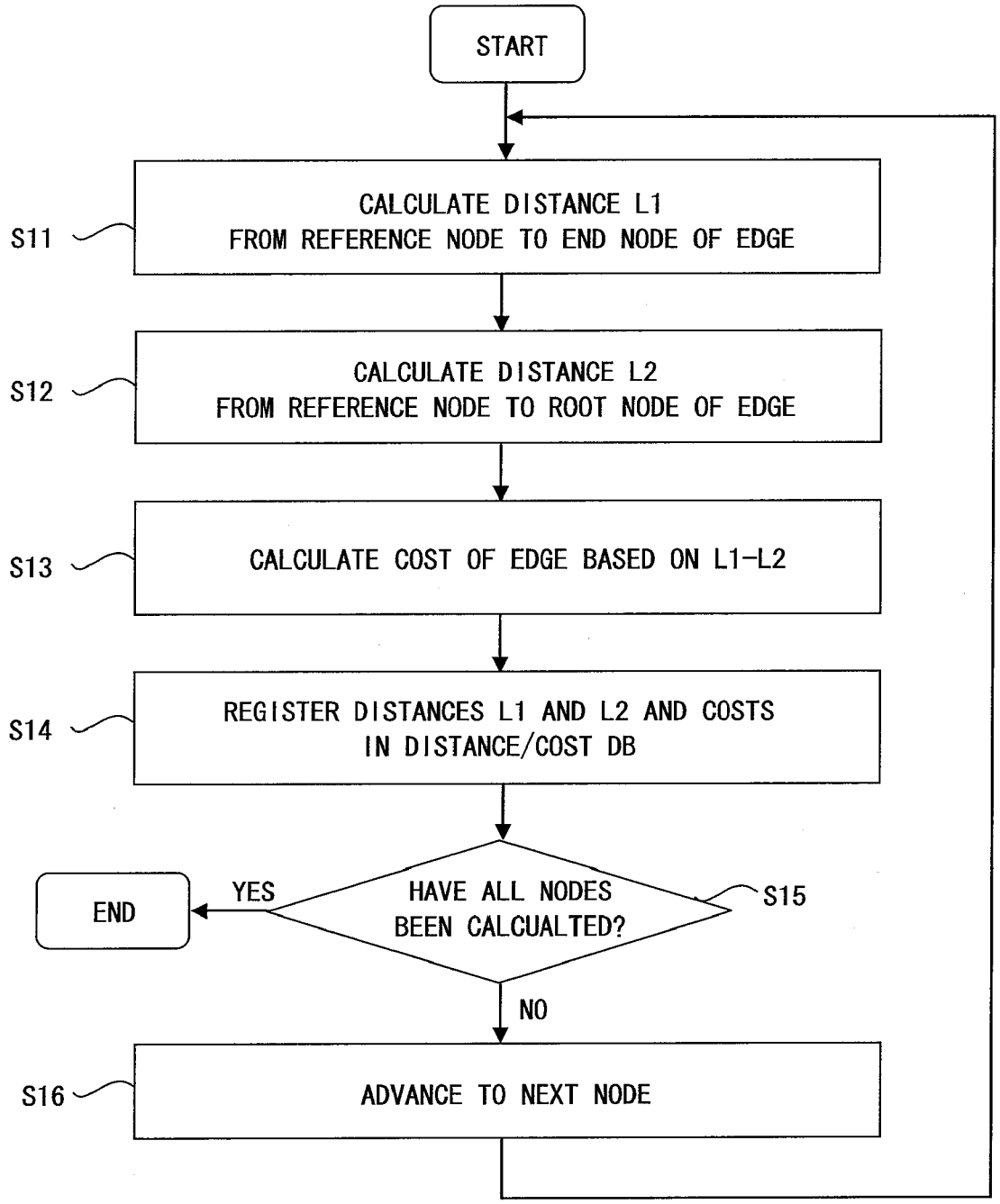
FIG. 11 is a flowchart showing a method of calculating an edge cost for a path determination device according to an embodiment of the present invention.

Next, a path search method according to this embodiment will be described in detail with reference to the flowcharts of FIGS. 10 and 11 and path diagrams shown in FIGS. 12 to 15. FIG. 10 is a flowchart showing a path determination method according to an embodiment of the present invention. FIG. 11 is a flowchart showing an edge cost calculation method. FIGS. 12A to 12I are diagrams each showing the path search method according to this embodiment. FIGS. 13A to 13K are diagrams each showing the path search method according to the prior art. FIG. 14 is a diagram showing paths generated by the path search method according to this embodiment. FIGS. 15A to 17J are diagrams each showing the path search method according to this embodiment in the case where an obstacle is present.

As shown in FIG. 10, first confirming that the focus node corresponds to the start point, the edge generation section 21 extends edges to all the eight neighboring nodes that are adjacent to each other vertically, horizontally, and diagonally (Step S1). Then, in this step, each cost is calculated by a method similar to the conventional method, assuming that (distance from starting point)=(cost of node) (Step S2).

Figure 12A:
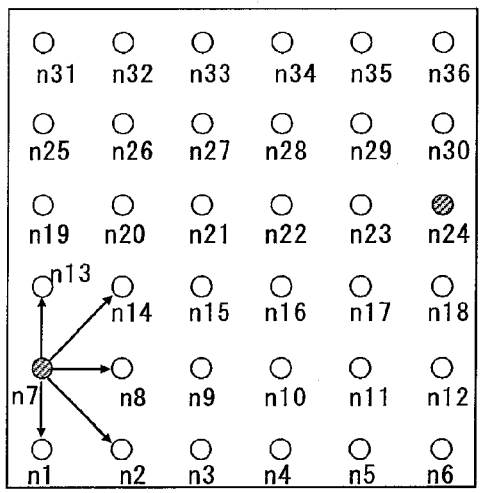
FIG. 12A is a pattern diagram showing a path search step according to an embodiment of the present invention in the order of steps.

Specifically, as shown in FIG. 12A, the edge generation section 21 generates edges for all the eight neighboring nodes adjacent to the start point node n7. Note that, in this example, it is impossible to extend edges leftward, upper left, and lower left, because a boundary of the grid area is present on the left side. Thus, edges extending from the start point node n7 to the nodes n1, n2, n8, n14, and n13 are generated. Then, the edge cost calculation/readout section 22 calculates each cost assuming that each cost of the edges extending from the start point n7, which is the focus node, to the subsequent nodes n1, n2, n8, n14, and n13 is equal to the distance thereof. Here, the costs of the edges from the start point n7 correspond to the costs of the nodes n1, n2, n8, n14, and n13. That is, the edge cost calculation/readout section 22 reads out the distance from the start point node n7.

Figure 12B:
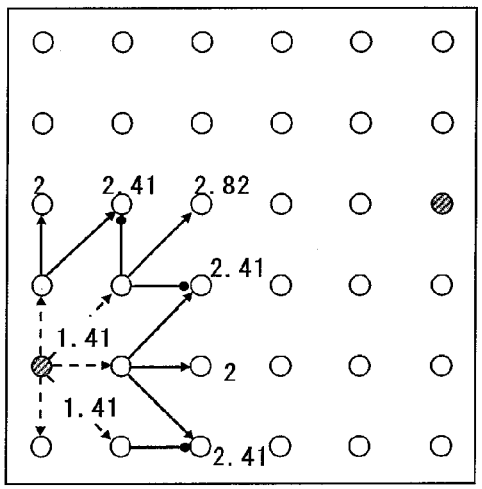
FIG. 12B is a pattern diagram showing a path search step according to an embodiment of the present invention in the order of steps.

Next, the edge generation section 21 selects a minimum cost node among end nodes of the edges (Step S3). In FIG. 12B, the costs from the start point to the nodes n1, n2, n8, n14, and n13 are equal to the distances thereof, and thus the costs are 1, 1.41, 1, 1.41, and 1. The edge generation section 21 selects the minimum cost nodes n8 and n13 among the nodes. Note that the n1 is located on the outermost periphery of the grid and no further cost calculation can be made. Thus, the node is excluded from the target of the calculation.

Next, assuming that the direction of the edges entering the nodes n8 and n13 is set as the forward direction, the edge generation section 21 extends the edges in three directions, i.e., forward, diagonally forward right, and diagonally forward left directions from the nodes n8 and n13 (Step S4). Next, the edge cost calculation/readout section 22 determines whether a node number N obtained from the start point to the end node of each edge is equal to or greater than 3, before calculating the cost of each edge. In this embodiment, since the cost is evaluated by tracing back two edges from the node of interest, the cost calculation method similar to the conventional method is employed before the number N from the start point to the end node is equal to or greater than 3.

As shown in FIG. 12B, the number of nodes located upstream of the end node of each edge extending from the nodes n8 and n13 is 2, so the process returns to Step S2 and each cost can be obtained assuming that (the cost of the edge)=(the distance of the edge) in the same manner as described above. Further, the cost of the end node of each edge is equal to the distance from the start point to each end node. For example, edges extend from the node n8 to the diagonally forward right node n3, the forward node n9, and the diagonally forward left node n15, and the costs of the end nodes are obtained as 2.41, 2, and 2.41, respectively (Step S3).

Nodes having a second minimum cost of 1.41 are the nodes n2 and n14 (Step S3). Thus, edges extend from the nodes n2 and n14 to diagonally forward right, the forward node, and the diagonally forward left node (Step S4). Here, the diagonally forward right node from the node n2 is not present and the diagonally forward left node corresponds to the node n3. In this case, an edge extends from the node n8 to the node n3. In such a case, it is assumed that a path having a lower node cost is adopted. It is assumed that, when there are paths having the same node cost, a path extending first is adopted. In this example, since the cost of the node n3 on the path from the node n2 is 2.41 and the cost of the node n3 on the path from the node n8 is 2, the path from the node n2 is not adopted. Likewise, while the edges extend from the node n14 to each of the nodes n15, n21, and n20, the edges extending to the nodes n15 and n20 adopt the path from the node n8 and the path from the node 13, respectively, and each path from the node n14 is not adopted. The processings from Step S2 are repeated until the number of end nodes extending from each edge reaches 3.

Figure 12C:
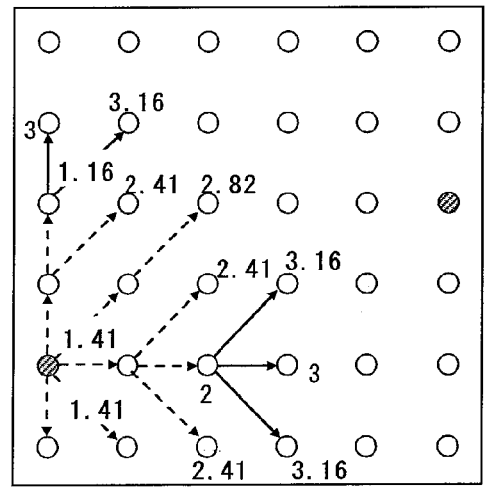
FIG. 12C is a pattern diagram showing a path search step according to an embodiment of the present invention in the order of steps.
Figure 12D:
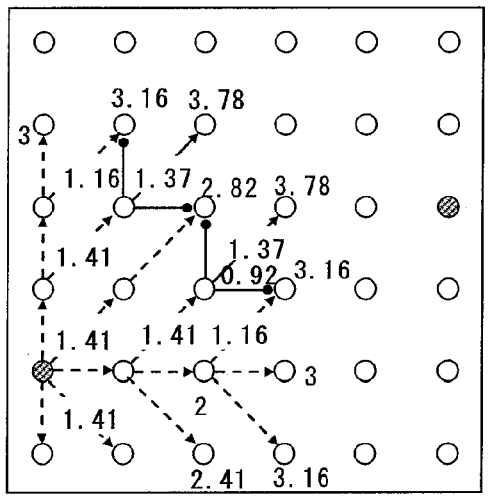
FIG. 12D is a pattern diagram showing a path search step according to an embodiment of the present invention in the order of steps.

Next, upon selection of the minimum cost node among the end nodes of the edges, the edge cost calculation/readout section 22 selects the nodes n9 and n19 in the state shown in FIG. 12B. Then, as shown in FIG. 12C, edges extend from the nodes n9 and n19 to the forward and diagonally forward left and right nodes. While each edge cost is calculated next, it is first determined whether the number of nodes from the start point node n7 is equal to or greater than 3 with respect to the end nodes n4, n10, n25, and n26 extending from the edges. Here, the number of nodes is 3, and the flow proceeds to Step S6.

In Step S6, each edge pattern is checked by tracing back two edges from the nodes n9 and n19 of current interest. When two edges are traced back from the node n9, the node n7 (start point node) is obtained, which serves as the reference node. The edge patterns correspond to patterns of the end nodes n4, n10, and n16 from the reference node n7. Based on the edge patterns, the costs of the end nodes n4, n10, and n16 are calculated (Step S7).

Here, the costs of the end nodes n4, n10, and n16 can be calculated by the path cost calculation section 23, based on (cost from the start point to the reference node)+(cost obtained based on the edge pattern from the reference node to the end node). The cost from the start point to the reference node may be obtained in such a manner that the edge cost calculation/readout section 22 reads out the costs of the edges constituting the path from the start point to the reference node, from the distance/cost DB 30, and adds the costs. In this example, since (reference node)=(start point) is satisfied, the cost of the end node is obtained from the edge pattern from the reference node to the end node. The costs of the end nodes n4, n10, and n16 are obtained as 3.16, 3, and 3.16, respectively. Likewise, the costs of the end nodes n25 and n26 are obtained as 3 and 3.16, respectively. These processings are repeated until the end node reaches the end point node n24 (Step S8), and then the state of FIG. 12H is obtained through FIGS. 12D, 12E, 12F, and 12G. In this case, since the edge extending from a node n17 reaches the end point node n24, (end node)=(end point node n24) is satisfied. At this point of time, the minimum cost path is selected and output (Step S9). In this example, the path as shown in FIG. 12I is generated. The path is a path closest to the path shown in FIG. 7F.

Next, a method for use in calculating each cost (cost of end node) from the start point to the end node of each edge will be described with reference to FIG. 11. As described above, the reference node for the focus node n9 corresponds to the node n7 which is the start point. First, the cost of the edge between the nodes n9→n4 is obtained. In this case, as shown in FIG. 11, the distance L1 (=3.16) from the reference node n7 to the end node n4 is first calculated (Step S11). Next, the distance L2 (=2) from the reference node n7 to the root node n9 of the edge is calculated (Step S12). The cost of the edge can be expressed as L1−L2=1.16 (Step S13). In this case, the distances L1 and L2 and the cost of each edge are registered in the distance/cost DB 30, thereby enabling construction of the database. Note that the edge cost calculation/readout section 22 may calculate the cost of each edge in a manner as described above, or may read out the distances L1 and L2 from the distance/cost DB 30 to calculate L1−L2. In the case of constructing the database, the distances and costs are calculated with respect to all the nodes (Steps S15 and S16).

Likewise, the cost of the edge between the nodes n9→n10 is expressed as {distance L1 (=3) from reference node n7 to end node n10 of edge}−{distance L2 (=2) from reference node n7 to root node n9 of edge}, and thus the cost is obtained as 1. Further, the cost of the edge between the nodes n9→n16 is expressed as {distance L1 (=3.16) from reference node n7 to end node n16 of edge}−{distance L2 (=2) from reference node n7 to root node n9 of edge}, and thus the cost is obtained as 1.16. As described above, the costs of the nodes n4, n10, and n16 are 3.16, 3, and 3.16, respectively. Likewise, the cost of the node n26 is 3.16, and the cost of the node n25 is 3.

Figure 12E:
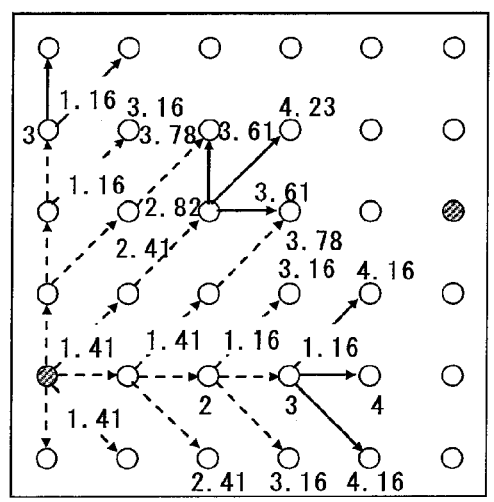
FIG. 12E is a pattern diagram showing a path search step according to an embodiment of the present invention in the order of steps.
Figure 12F:
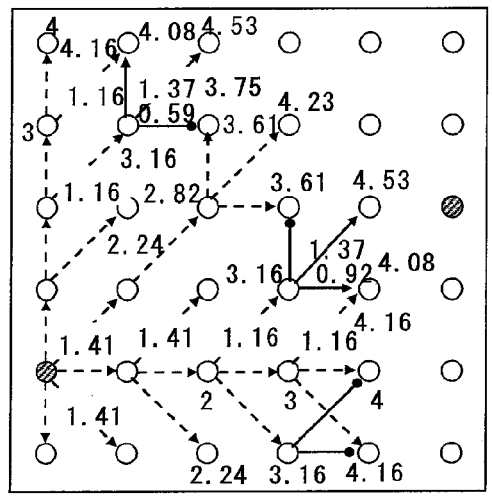
FIG. 12F is a pattern diagram showing a path search step according to an embodiment of the present invention in the order of steps.
Figure 12G:
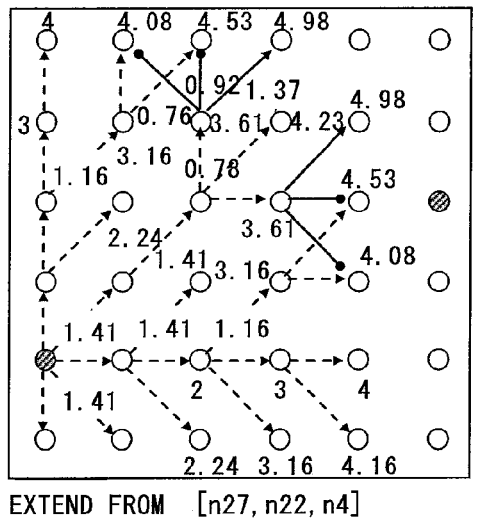
FIG. 12G is a pattern diagram showing a path search step according to an embodiment of the present invention in the order of steps.
Figure 12H:
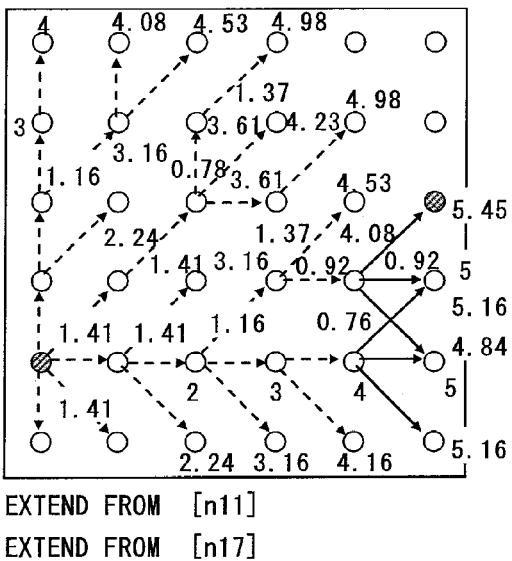
FIG. 12H is a pattern diagram showing a path search step according to an embodiment of the present invention in the order of steps.
Figure 12I:
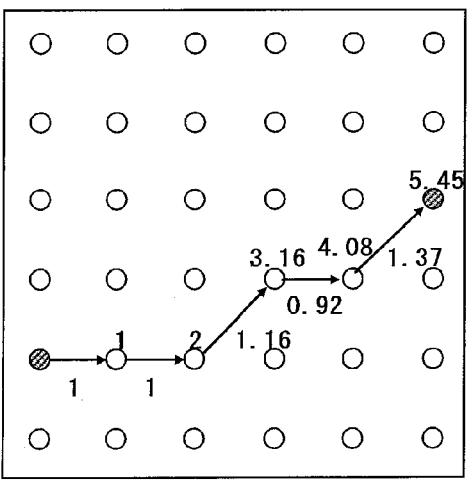
FIG. 12I is a pattern diagram showing a path search step according to an embodiment of the present invention in the order of steps.

Next, a description is given of the cost of the node n27 shown in FIG. 12E. Paths having an edge extending from the node n20 and an edge extending from the node n21 are generated for the node n27. This case shows an example where the cost of the path which is first generated from the node n20 is higher than that of the path which is subsequently generated from the node n21, and the path which is subsequently generated from the node n21 is adopted.

First, a description is given of a case where the cost of the node n27 is obtained by extending the edge from the node n20 to the node 27. The cost of the edge between the nodes n20→n27 is given by (distance from reference node n7 to node n27)−(distance from reference node n7 to node n20), and thus, 3.61−2.24=1.37 is satisfied. In this case, the cost of the node n27 is expressed as (cost of nodes n7→n13)+(cost of nodes n13→n20)+(cost of nodes n20→n27), and thus, 1+1.41+1.37=3.78 is satisfied.

After that, the path having the edge extending from the node n21 to the node n27 is generated. In this case, the cost of the edge between the nodes n21→n27 is given by (distance from reference node n7 to node n27)−(distance from reference node n7 to node n21), and thus, 3.61−2.82=0.79 is satisfied. In this case, the cost of the node n27 is expressed as (cost of nodes n7→n14)+(cost of nodes n14→n21)+(cost of nodes n21→n27), and thus, 1.41+1.41+0.79=3.61 is satisfied. In this manner, the path having the edge extending from the node n20 to the node n27 is generated earlier. However, since the path passing through the node n21 has a lower cost of the node n27, the path from the node n20 is not adopted as the path for the node n27, and the cost from the node 21 is adopted.

Figure 13A:
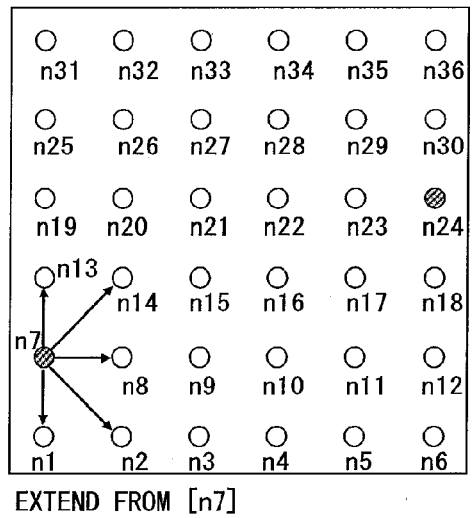
FIG. 13A is a pattern diagram showing a conventional path search step in the order of steps.
Figure 13B:
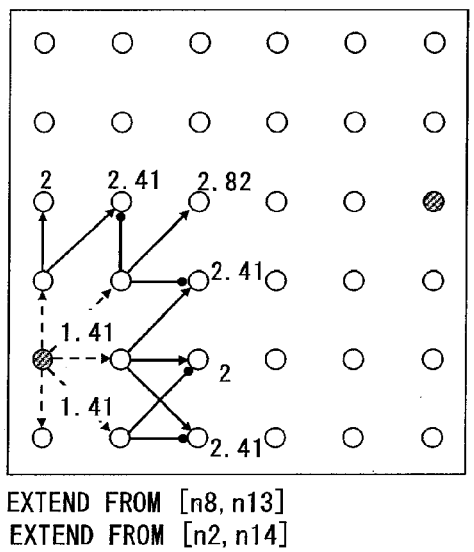
FIG. 13B is a pattern diagram showing a conventional path search step in the order of steps.
Figure 13C:
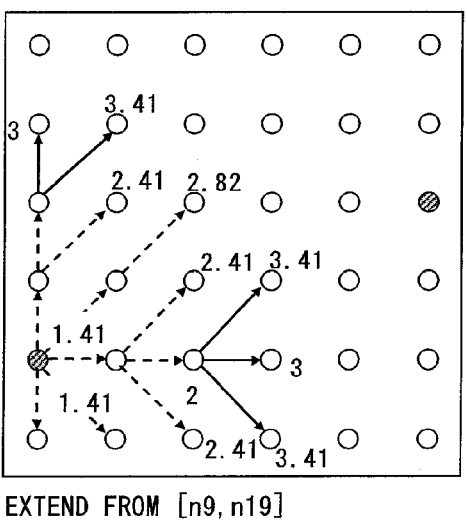
FIG. 13C is a pattern diagram showing a conventional path search step in the order of steps.
Figure 13D:
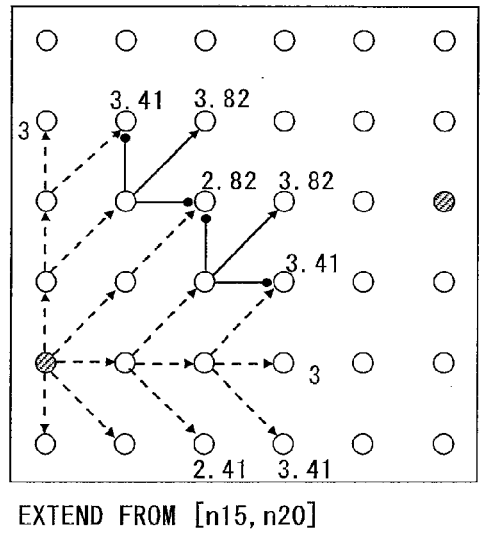
FIG. 13D is a pattern diagram showing a conventional path search step in the order of steps.
Figure 13E:
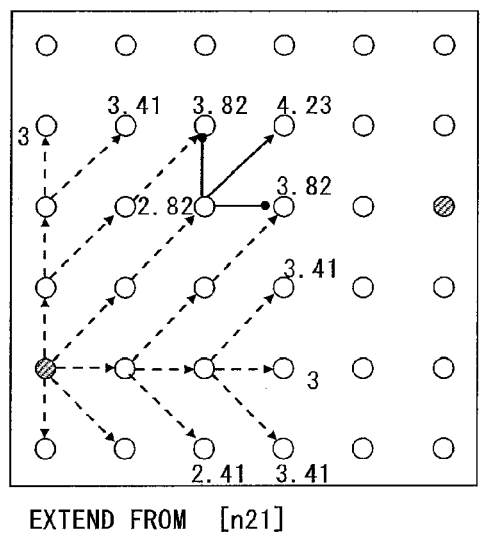
FIG. 13E is a pattern diagram showing a conventional path search step in the order of steps.
Figure 13F:
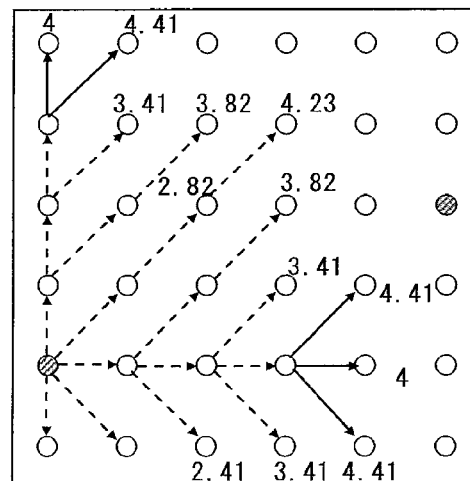
FIG. 13F is a pattern diagram showing a conventional path search step in the order of steps.
Figure 13G:
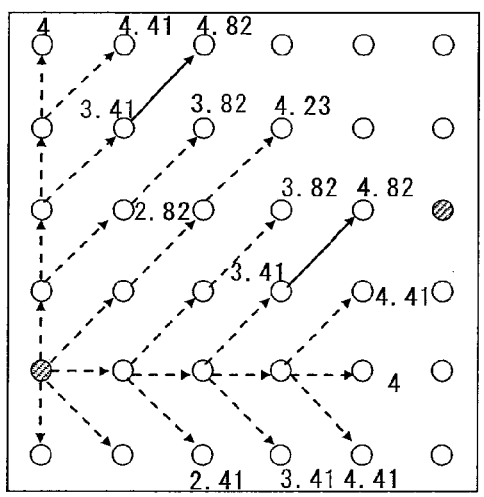
FIG. 13G is a pattern diagram showing a conventional path search step in the order of steps.
Figure 13H:
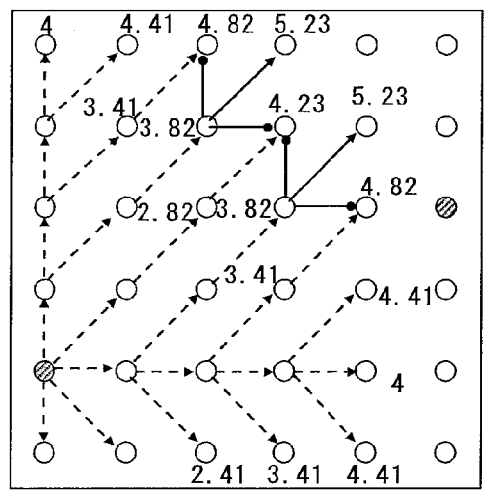
FIG. 13H is a pattern diagram showing a conventional path search step in the order of steps.
Figure 13I:
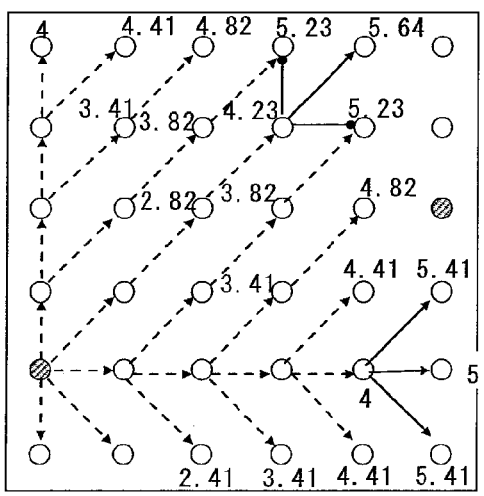
FIG. 13I is a pattern diagram showing a conventional path search step in the order of steps.
Figure 13J:
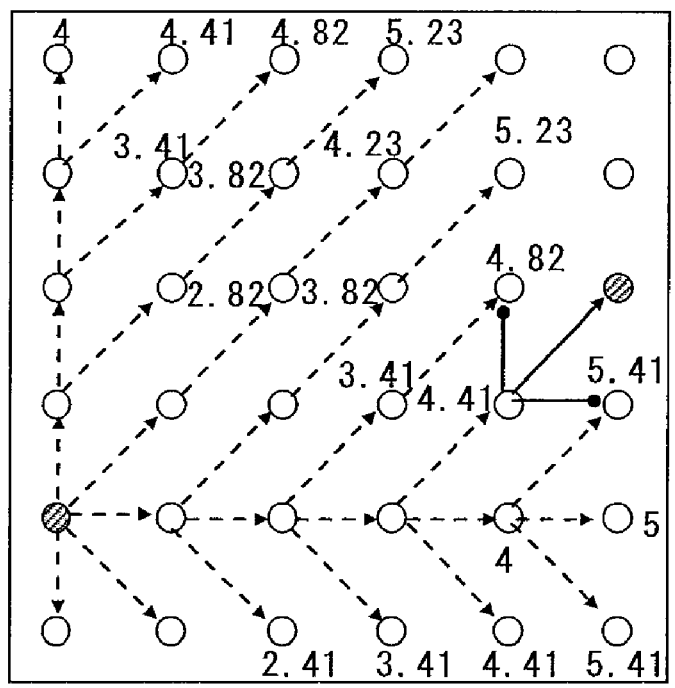
FIG. 13J is a pattern diagram showing a conventional path search step in the order of steps.
Figure 13K:
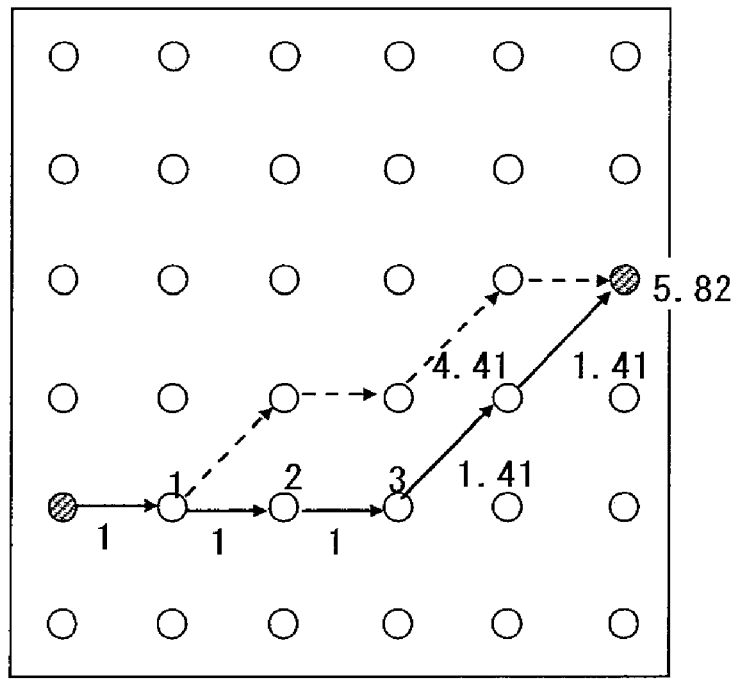
FIG. 13K is a pattern diagram showing a conventional path search step in the order of steps.
Figure 14:
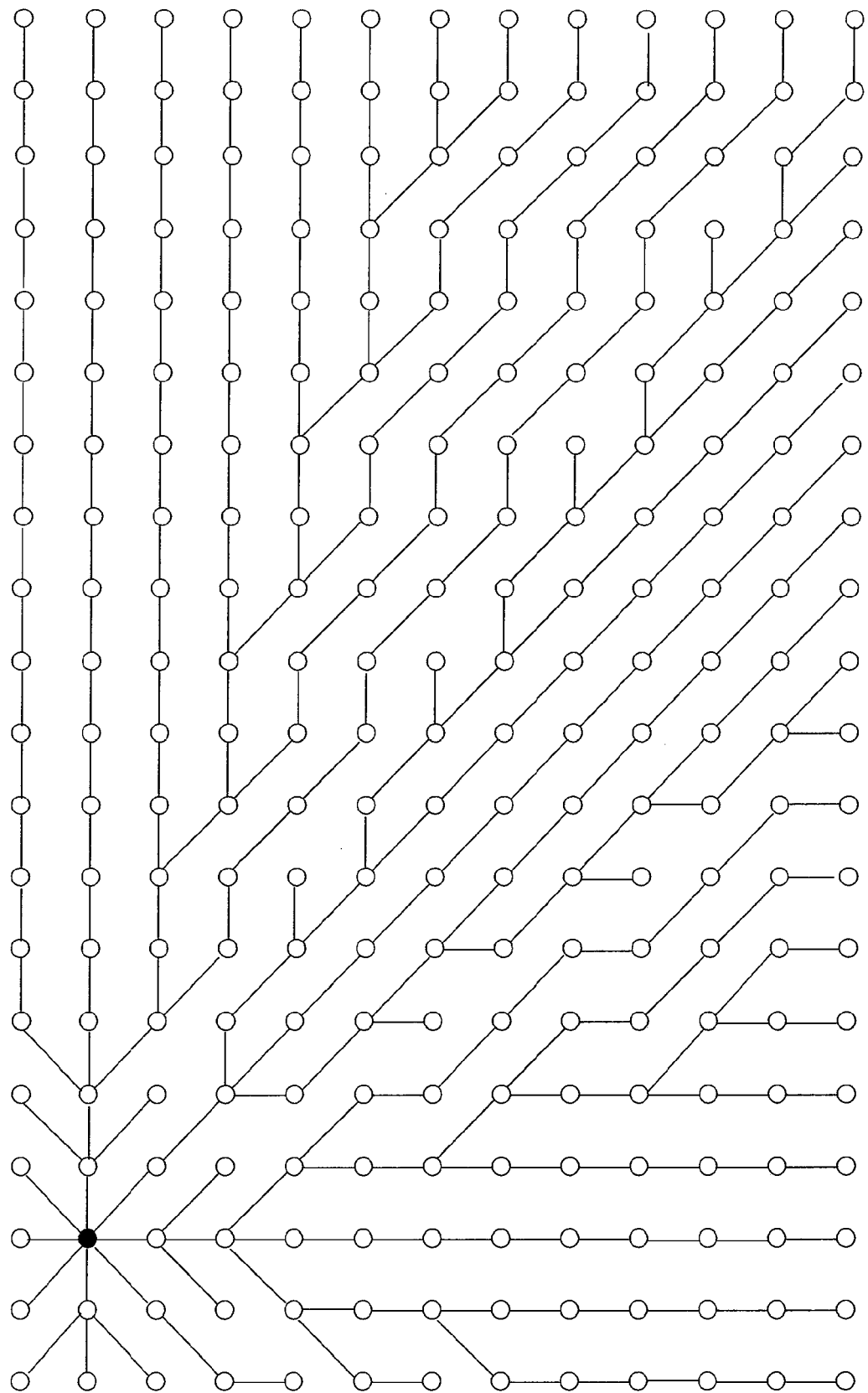
FIG. 14 is a pattern diagram showing paths generated by a path search method according to an embodiment of the present invention.
Figure 15A:
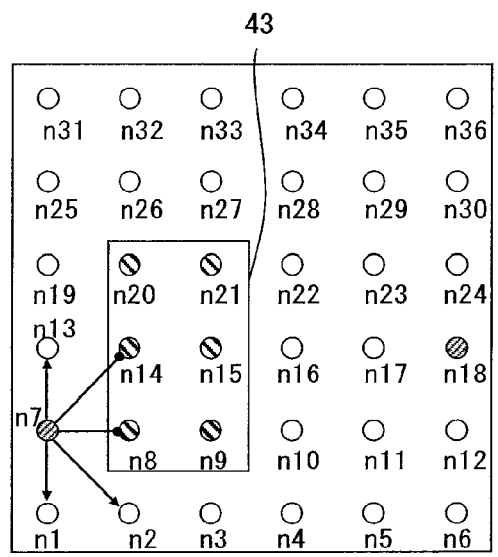
FIG. 15A is a pattern diagram showing a path search step according to an embodiment of the present invention in the order of steps and also showing a path search step in the case where an obstacle is present.
Figure 15B:
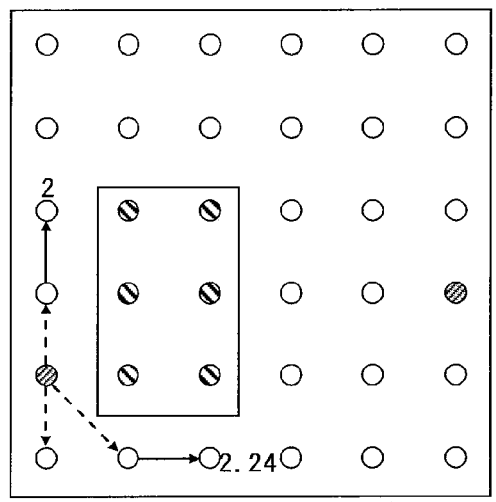
FIG. 15B is a pattern diagram showing a path search step according to an embodiment of the present invention in the order of steps and also showing a path search step in the case where an obstacle is present.
Figure 15C:
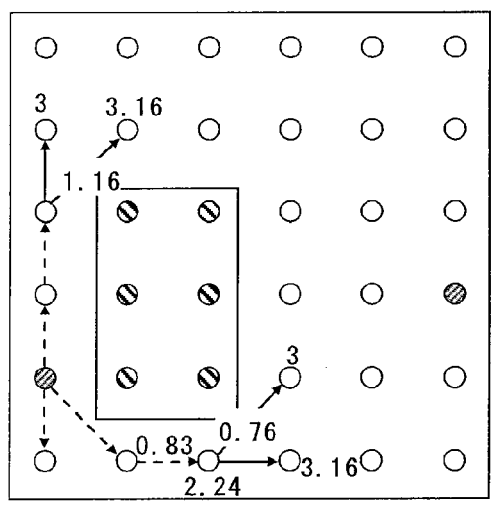
FIG. 15C is a pattern diagram showing a path search step according to an embodiment of the present invention in the order of steps and also showing a path search step in the case where an obstacle is present.
Figure 15D:
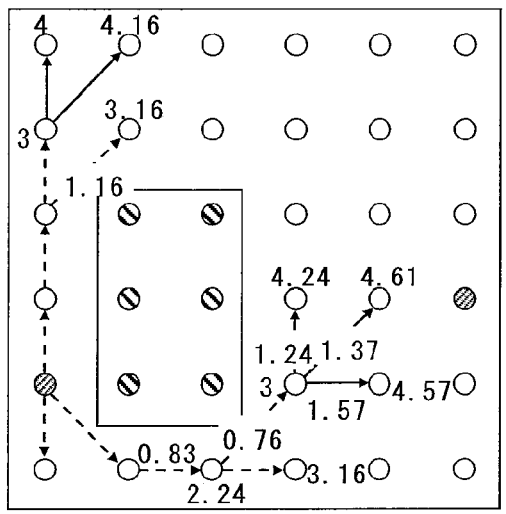
FIG. 15D is a pattern diagram showing a path search step according to an embodiment of the present invention in the order of steps and also showing a path search step in the case where an obstacle is present.
Figure 15E:
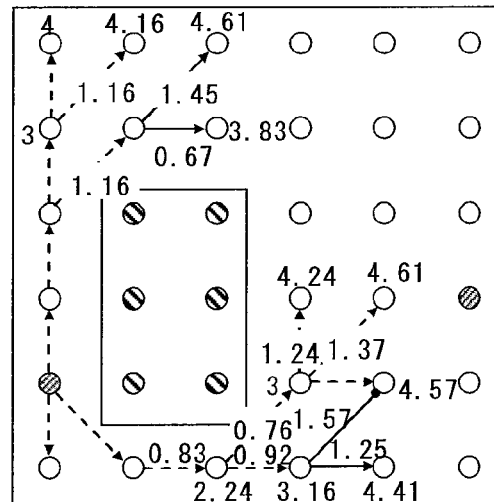
FIG. 15E is a pattern diagram showing a path search step according to an embodiment of the present invention in the order of steps and also showing a path search step in the case where an obstacle is present.
Figure 15F:
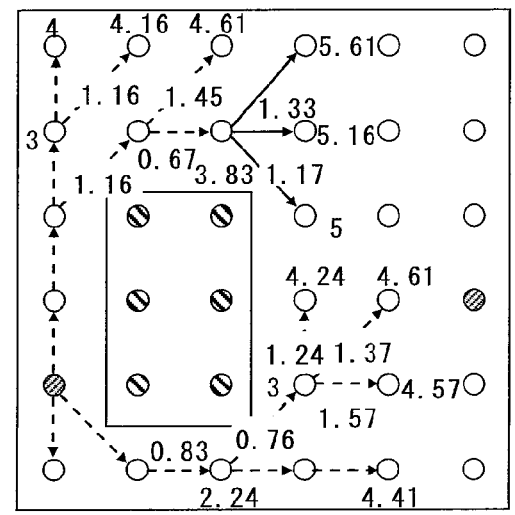
FIG. 15F is a pattern diagram showing a path search step according to an embodiment of the present invention in the order of steps and also showing a path search step in the case where an obstacle is present.
Figure 15G:
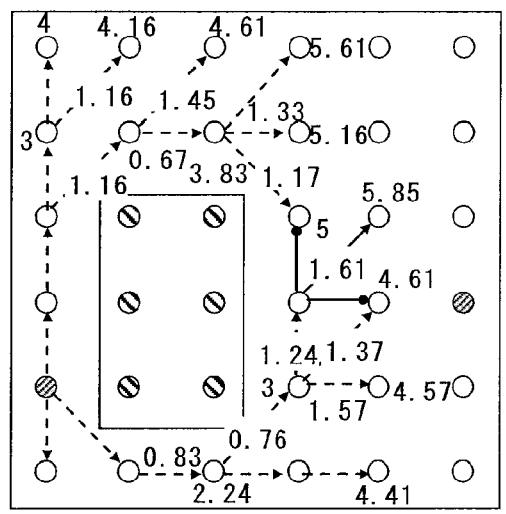
FIG. 15G is a pattern diagram showing a path search step according to an embodiment of the present invention in the order of steps and also showing a path search step in the case where an obstacle is present.
Figure 15H:
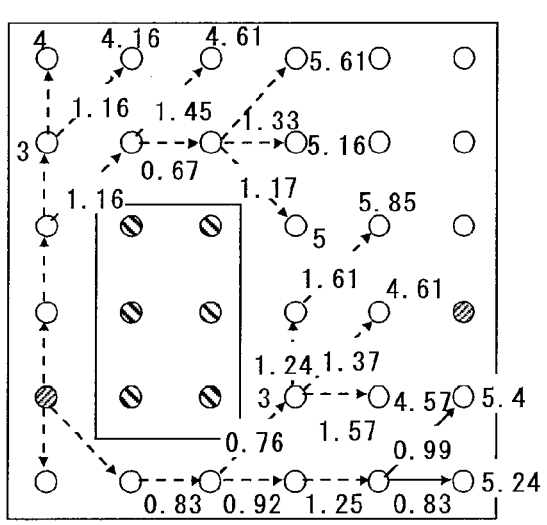
FIG. 15H is a pattern diagram showing a path search step according to an embodiment of the present invention in the order of steps and also showing a path search step in the case where an obstacle is present.
Figure 15I:
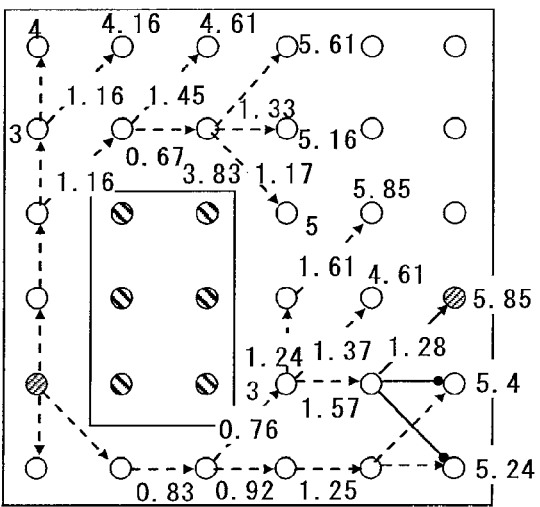
FIG. 15I is a pattern diagram showing a path search step according to an embodiment of the present invention in the order of steps and also showing a path search step in the case where an obstacle is present.
Figure 15J:
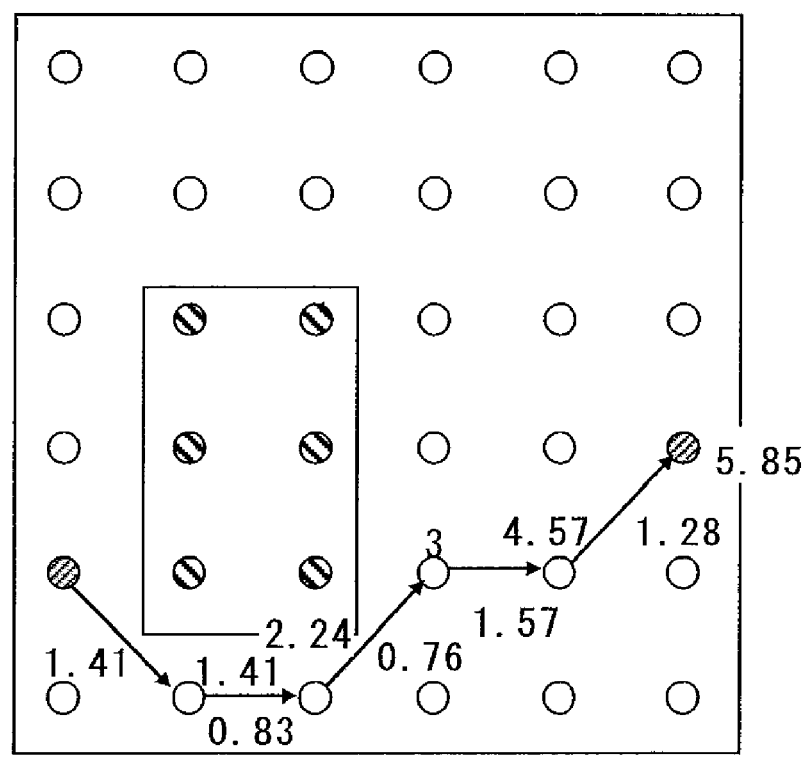
FIG. 15J is a pattern diagram showing a path search step according to an embodiment of the present invention in the order of steps and also showing a path search step in the case where an obstacle is present.

On the other hand, as shown in FIGS. 13A to 13K, when the path search is carried out by using the conventional method, the cost as shown in FIG. 13K is extracted. This is because the path has the same cost as that of the ideal path indicated by the dashed line according to the conventional method. In this embodiment, since the node of the edge is calculated based on the distance from the reference node to the end node of the edge and the distance from the reference node to the root node, the path that is closest to the ideal path is generated.

FIG. 14 is a diagram showing paths generated according to the path search method according to this embodiment from a start point ST. Particularly when the end point is not set, paths are generated in the manner as shown in FIG. 14.

FIGS. 15A to 15J each show a path search result in the case where an obstacle is present. As shown in FIGS. 15A to 15J, when an obstacle 43 is present in an area including the nodes n8, n9, n14, n15, n20, and n21, a path (n7→n13→n19→n26→n27→n22) is generated in a direction toward the end point from above the obstacle 43, and a path (n7→n2→n3→n10→n11→n18) is generated in the direction toward the end point from below the obstacle 43. The path generated in the direction toward the end point from below first reaches the end point n18.

In this embodiment, the cost of the edge extending from the focus node to the neighboring node is not obtained simply as the distance, but is obtained based on the first distance from the reference node to the neighboring node (end node) and the second distance from the reference node to the focus node (root node). The reference node is a node obtained by tracing back at least one node from the focus node, and the cost of each edge is calculated based on the shortest distance among a plurality of nodes. Thus, compared to the case of evaluating the costs uniformly as the distance of each edge, more detailed cost evaluation based on the pattern of the edges can be made, and the angular resolution of the path is improved, thereby the generation of the path that is close to the ideal shortest distance. Further, the angular resolution of the path is improved by the more detailed cost evaluation based on the pattern of the edges, and the path that is close to the ideal shortest distance can be generated, thereby enabling the robot to express a more natural movement operation.

Note that the present invention is not limited to the above embodiments, and various modifications can be made as a matter of course without departing from the gist of the present invention. For example, the above embodiments describe a hardware configuration, but the present invention is not limited thereto. It is possible to achieve arbitrary processing by causing a central processing unit (CPU) to execute a computer program. In this case, it is possible to provide a computer program recorded on a recording medium. Also, it is possible to provide a computer program transmitted through transmission media such as the Internet.

Industrial Applicability

The present invention is widely applicable to, for example, a path planning device and a path planning method for selecting a minimum cost path among paths from a start point to an end point, which are included in an area represented by a grid, a cost evaluation device for use in cost evaluation carried out in the path planning device, and a moving body having the path planning device mounted thereon.

The invention claimed is:

1. A path search device that selects a minimum cost path among paths from a start point to an end point, which are included in an area represented by a grid, the path search device comprising:
a path cost calculation section that calculates a cost of a path from the start point to the end point, assuming that each grid point is a node and that, when a node obtained by tracing back a predetermined number of nodes from a focus node of current interest in a direction toward the start point along the path is a reference node, a cost of an edge extending from the focus node to a neighboring node adjacent to the focus node is a value given by subtracting a second distance representing a distance from the reference node to the focus node from a first distance representing a distance from the reference node to the neighboring node; a path determination section that determines a path according to the cost of the path; an edge generation section that generates edges extending to neighboring nodes located at least forward, diagonally forward right, and diagonally forward left of a focus node, assuming that a minimum cost node among end nodes each located at an end of the edges is the focus node, when a cost from the start point to a given node is a cost of the given node; and an edge cost calculation/readout section that calculates the first distance and the second distance or reads out the first distance and the second distance from a database, wherein: the path cost calculation section calculates a cost of a path from the start point to each of the neighboring nodes as a sum of costs of edges constituting the path; and the path determination section selects a path having a minimum cost from the start point to the end point, when the neighboring node corresponds to the end point.

2. The path search device according to claim 1, wherein the edge generation section extends edges to eight neighboring nodes adjacent to the start point, when the focus node corresponds to the start point.

3. The path search device according to claim 1, wherein the edge cost calculation/readout section sets a cost of an edge extending from the focus node to the neighboring node as a distance between the focus node and the neighboring node, before the number of nodes from the start point to the neighboring node reaches the predetermined number.

4. The path search device according to claim 1, wherein the path cost calculation section calculates a cost of the neighboring node as a sum of distances of edges constituting a path from the start point to the neighboring node, before the number of nodes from the start point to the neighboring node reaches the predetermined number.

* * * * *